(12) United States Patent
Taguchi et al.

(10) Patent No.: US 6,485,051 B1
(45) Date of Patent: Nov. 26, 2002

(54) GAS GENERATOR

(75) Inventors: Seigo Taguchi, Himeji (JP); Hiroyuki Ochi, Himeji (JP); Kenji Sako, Himeji (JP); Yoshiyuki Kishino, Himeji (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 0 days.

(21) Appl. No.: 09/719,563

(22) PCT Filed: Apr. 28, 1999

(86) PCT No.: PCT/JP99/02291

§ 371 (c)(1),
(2), (4) Date: Dec. 28, 2000

(87) PCT Pub. No.: WO00/66402

PCT Pub. Date: Nov. 9, 2000

(51) Int. Cl.[7] ............................................. B60R 21/26
(52) U.S. Cl. ...................................... 280/736; 280/742
(58) Field of Search ................................ 280/741, 736, 280/7, 8, 740, 743.1, 742

(56) References Cited

U.S. PATENT DOCUMENTS

| | | | | |
|---|---|---|---|---|
| 5,564,743 A | * | 10/1996 | Marchant | 280/741 |
| 6,019,389 A | * | 2/2000 | Burgi et al. | 280/736 |
| 6,032,979 A | * | 3/2000 | Mossi et al. | 280/741 |
| 6,168,200 B1 | * | 1/2001 | Greist et al. | 280/736 |
| 6,189,924 B1 | * | 2/2001 | Hock | 280/736 |
| 6,189,927 B1 | * | 2/2001 | Mossi et al. | 280/741 |
| 6,227,565 B1 | * | 5/2001 | McFarland et al. | 280/736 |
| 6,257,617 B1 | * | 7/2001 | McFarland et al. | 280/736 |
| 6,315,322 B1 | * | 11/2001 | Mika | 280/736 |

* cited by examiner

*Primary Examiner*—Paul N. Dickson
*Assistant Examiner*—Deanna L. Draper
(74) *Attorney, Agent, or Firm*—Oblon, Spivak, McClelland, Maier & Neustadt, P.C.

(57) ABSTRACT

A gas generator that can controllably allow the airbag to inflate and expand slowly at an initial stage of the inflation and thereafter inflate and expand rapidly so that the intended function of the airbag can be fulfilled. In the gas generator, an enclosed space (S) in a housing (1) is partitioned into two combustion chambers (3, 4), in which gas generating agents (6), a filtering member (7) and an igniter (8, 9) are arranged, respectively. The combustion chambers (3, 4) are communicated to each other through the filtering member (7). The igniters are operated with time difference so that the airbag can be inflated and expanded moderately by a small amount of gas generated in one combustion chamber at the initial stage of inflation and then is inflated and expanded rapidly by a large amount of gas generated in the respective combustion chambers, thus achieving multistage control of the expansion of the airbag.

43 Claims, 16 Drawing Sheets

METAL WIRE OF STOCKING STITCH

GAS GENERATOR

TECHNICAL FIELD

This invention relates to something to inflate and expand an airbag of an automobile and, more particularly, to a gas generator capable of controlling an extensive form of the airbag.

BACKGROUND ART

In order to protect riders in an automobile from collision, the gas generator to immediately expand and inflate the airbag is built in an airbag module fitted in a steering wheel and an instrument panel. The gas generator is operated under control of collision detection signals from a collision sensor detecting a collision, to produce a large amount of high temperature gas instantaneously.

One typical example of the gas generator to inflate and expand the airbag is shown in FIG. 16. As illustrated, the gas generator has a housing 100 having an annular. enclosed space formed by the double cylinder structure of inner and outer cylinders of upper and lower lidded containers 101, 102 which are put in abutment with and frictional press-contact with each other. In the enclosed space of the housing 100, gas generating agents 103 and a cylindrical filtering member 104 are contained in order from the inner cylinder toward the radial outside. Arranged in the inner cylinder are an igniter 105 that is ignited under control of collision detection signals from the collision sensor and an inflammation agent 106 that is ignited by ignition of the igniter 105.

In this gas generator, the inflammation agent 106 is ignited by ignition of the igniter 105 under control of the collision detection signals from the collision sensor and, further, flame of the inflammation agent 106 is spurted into the enclosed space through a flame guidable aperture 107 of the inner cylinder, whereby the gas generating agents 103 are ignited and burnt to thereby produce a large amount of high temperature gas instantaneously. The large amount of temperature gas enters the filtering member 104 for slag collection and cooling of the gas thereat and thereafter is discharged from a number of gas discharging holes 101a of the upper container 101 into the airbag, so as to inflate and expand the airbag rapidly.

With the conventional gas generator, regardless of the patterns of automobile collision (low-speed collision, high-speed collision, etc.) and seating position of a rider (a normal seat position, an abnormal seat position, such as a stoop-shouldered position, etc.), the igniter is ignited under control of the collision detection signals from the collision sensor to thereby produce a large amount of gas instantaneously to inflate and expand the airbag rapidly. This sometimes provides the disadvantage that when the rider takes a seat position immediately behind the steering wheel or the instrument panel or when the automobile collides at low speed, the rapidly inflating airbag gives a shock to the rider (punching phenomenon), rather than fulfills its intended function to protect the rider.

It is object of the present invention to provide a gas generator that can controllably allow the airbag to inflate and expand slowly at an initial stage of the inflation and thereafter inflate and expand rapidly so that the intended function of the airbag.can be fulfilled.

DISCLOSURE OF THE INVENTION

In the first invention, an enclosed space of a housing is partitioned into a plurality of combustion chambers, and gas generating agents, a filtering member and an igniter are arranged in the combustion chambers, respectively.

This enables the gas discharged into the airbag to be controlled by operating the igniters with time difference, and as such can achieve a multistage control of expansion of the airbag.

In addition, in the first invention, the combustion chambers are communicated to each other. This can allow the combustion of the gas generating agents in the combustion chambers to be effected with a total volume of the housing (enclosed space). Thus, when the igniters are operated with time difference, the airbag can be inflated and expanded moderately by a small amount of gas that is generated in the single combustion chamber and is suppressed in pressure rise characteristic in the initial stage of expansion and thereafter can be inflated and expanded rapidly by the addition of the gas generated in the respective combustion chambers and controlled to a specified gas pressure. characteristic and maximum pressure.

As a result of this, the rider is prevented from being given the shock by the airbag inflated and expanded rapidly in the initial expansion stage (punching phenomenon) and thus the air can fulfill its intended function to protect the rider.

In the second invention, an enclosed space of a housing is partitioned into two combustion chambers by a partition member, and gas generating agents, a filtering member and an igniter are arranged in the combustion chambers, respectively.

This enables the gas discharged into the airbag to be controlled by operating the two igniters with time difference, and as such can achieve a two-stage control of expansion of the airbag.

In addition, in the second invention, the combustion chambers are communicated to each other. This can allow the amount of gas and pressure rise characteristic of the expansion of the airbag to be controlled, to inflate and expand the airbag, as is the case with the first invention.

In the third invention, a housing is formed into a short, cylindrical shape; an enclosed space in the housing is partitioned into two combustion chambers by a partition member; and gas generating agents and a filtering member are arranged in the combustion chambers, respectively. Also, a long, cylindrical, inner casing and a short, cylindrical, inner casing are extended into the combustion chambers, respectively, and igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. In addition, since the housing is formed into a short, cylindrical shape, the gas generator is optimum to inflate and expand the airbag for driver seat.

In addition, in the third invention, the combustion chambers are communicated to each other. This can allow the amount of gas and pressure rise characteristic of the expansion of the airbag to be controlled, to inflate and expand the airbag, as is the case with the first invention.

In the fourth invention, the housing is formed into a short, cylindrical shape; the enclosed space in the housing is partitioned into two combustion chambers by the partition member; and the gas generating agents and the filtering member are arranged in the combustion chambers, respectively. Also, the long, cylindrical, inner casing and the short, cylindrical, inner casing are extended into the combustion chambers, respectively; upper and lower lids of the housing are joined via the long, cylindrical, inner casing; and the igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. Since the structure of the lids of the housing being joined via the long, cylindrical casing enables structural strength of the housing to increase, it can suitably be used for a large-sized gas generator to produce a large amount of gases and for non-azide-base generating agents to generate high pressure gas. In addition, since the housing is formed into the short, cylindrical shape, the gas generator is optimum to inflate and expand the airbag for driver seat.

In addition, in the fourth invention, the combustion chambers are communicated to each other. This can allow the amount of gas and pressure rise characteristic of the expansion of the airbag to be controlled, to inflate and expand the airbag, as is the case with the first invention.

In the fifth invention, the housing is formed into a short, cylindrical shape; the combustion space in the housing is partitioned into two combustion chambers by the partition member; and the gas generating agents and the filtering member are arranged in the combustion chambers, respectively. Also, the long, cylindrical, inner casing and the short, cylindrical, inner casing are extended into the combustion chambers, respectively; and the igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. In addition, since the housing is formed into the short, cylindrical shape, the gas generator is optimum to inflate and expand the airbag for driver seat.

In addition, in the fifth invention, the enclosed space in the housing is partitioned into the gas passage space and the combustion spaces by an inner cylindrical member, whereby the combustion chambers are communicated to each other via the gas passage space. This enables the combustion chambers to be communicated to each other with a simple structure of simply adding the inner cylindrical member and also can allow the amount of gas and pressure rise characteristic of the expansion of the airbag to be controlled, to inflate and expand the airbag, as is the case with the first invention.

In the sixth invention, a housing is formed into a short, cylindrical shape; an enclosed space in the housing is partitioned into two combustion chambers by a partition member; and gas generating agents and a filtering member are arranged in the combustion chambers, respectively. Also, a long, cylindrical, inner casing and a short, cylindrical, inner casing are extended into the combustion chambers, respectively; upper and lower lids of the housing are joined via the long, cylindrical, inner casing; and igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. Since the structure of the lids of the housing being joined via the long, cylindrical casing enables structural strength of the housing to increase, it can suitably be used for a large-sized gas generator to produce a large amount of gases and for non-azide-base generating agents to generate high pressure gas. In addition, since the housing is formed into the short, cylindrical shape, the gas generator is optimum to inflate and expand the airbag for driver seat.

In addition, in the sixth invention, the enclosed space in the housing is partitioned into the gas passage space and the combustion spaces by an inner cylindrical member, whereby the combustion chambers are communicated to each other via the gas passage space. This enables the combustion chambers to be communicated to each other with a simple structure of simply adding the inner cylindrical member and also can allow the amount of gas and pressure rise characteristic of the expansion of the airbag to be controlled, to inflate and expand the airbag, as is the case with the first invention.

In the seventh invention, the housing is formed into a short, cylindrical shape; a combustion space in the housing is partitioned into two combustion chambers by the partition member; and the gas generating agents and the filtering member are arranged in the combustion chambers, respectively. Also, the long, cylindrical, inner casing and the short, cylindrical, inner casing are extended into the combustion chambers, respectively; and the igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. In addition, since the housing is formed into the short, cylindrical shape, the gas generator is optimum to inflate and expand the airbag for driver seat.

In addition, in the seventh invention, the enclosed space in the housing is partitioned into the gas passage space and the combustion spaces by an inner cylindrical member and a filtering member, whereby the combustion chambers are communicated to each other via the gas passage space and the filtering member. This enables the combustion chambers to be communicated to each other with a simple structure of simply adding the inner cylindrical member combined with the filtering member and also can allow the amount of gas and pressure rise characteristic of the expansion of the airbag to be controlled, to inflate and expand the airbag, as is the case with the first invention.

In the eighth invention, a housing is formed into a short, cylindrical shape; an enclosed space in the housing is partitioned into two combustion chambers by a partition member; and gas generating agents and a filtering member are arranged in the combustion chambers, respectively. Also, a long, cylindrical, inner casing and a short, cylindrical, inner casing are extended into the combustion chambers, respectively; upper and lower lids of the housing are joined via the long, cylindrical, inner casing; and igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. Since the structure of the lids of the housing being joined via the long, cylindrical casing enables structural strength of the housing to increase, it can suitably be used for a large-sized gas generator to produce a large amount of gases and for non-azide-base generating agents to generate high pressure gas. In addition, since the housing is formed into the short, cylindrical shape, the gas generator is optimum to inflate and expand the airbag for driver seat.

In addition, in the eighth invention, the enclosed space in the housing is partitioned into the gas passage space and the combustion spaces by an inner cylindrical member and a filtering member, whereby the combustion chambers are communicated to each other via the gas passage space and the filtering member. This enables the combustion chambers to be communicated to each other with a simple structure of simply adding the inner cylindrical member combined with the filtering member and also can allow the amount of gas and pressure rise characteristic of the expansion of the airbag to be controlled, to inflate and expand the airbag, as is the case with the first invention.

In the tenth invention, a housing is formed into a short, cylindrical shape; an enclosed space in the housing is partitioned into two combustion chambers by a partition member; and gas generating agents and a filtering member are arranged in the combustion chambers, respectively. Also, a long, cylindrical, inner casing and a short, cylindrical, inner casing are extended into the combustion chambers, respectively; and igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. In addition, since the housing is formed into the short, cylindrical shape, the gas generator is optimum to inflate and expand the airbag for driver seat.

In addition, in the ninth invention, the combustion chambers are communicated to each other through gas passing holes in the partition member. This enables the combustion chambers to be communicated to each other with a simple structure of simply forming the gas passing holes in the partition member and also can allow the amount of gas and pressure rise characteristic of the expansion of the airbag to be controlled, to inflate and expand the airbag, as is the case with the first invention.

In the tenth invention, the housing is formed into a short, cylindrical shape; the enclosed space in the housing is partitioned into the two combustion chambers by the partition member; and the gas generating agents and the filtering member are arranged in the combustion chambers, respectively. Also, the long, cylindrical, inner casing and the short, cylindrical, inner casing are extended into the combustion chambers, respectively; upper and lower lids of the housing are joined via the long, cylindrical, inner casing; and igniters are arranged in the inner casings, respectively.

This enables the gas discharged into the airbag to be controlled by operating the two igniters with time difference, and as such can achieve a two-stage control of expansion of the airbag. Besides, the gas generating agents in the combustion chambers can be burnt with a simple structure that the igniters are arranged in their respective inner casings. Since the joining structure via the long, cylindrical casing enables structural strength of the housing to increase, it can suitably be used for a large-sized gas generator to produce a large amount of gases and for non-azide-base generating agents to generate high pressure gas. In addition, since the housing is formed into the short, cylindrical shape, the gas generator is optimum to inflate and expand the airbag for driver seat.

In addition, in the tenth invention, the combustion chambers are communicated to each other through the gas passing holes in the partition member. This enables the combustion chambers to be communicated to each other with a simple structure of simply forming the gas passing holes in the partition member and also can allow the amount of gas and pressure rise characteristic of the expansion of the airbag to be controlled, to inflate and expand the airbag, as is the case with the first invention.

In the eleventh invention, the housing is formed into a long, cylindrical shape; the enclosed space in the housing is partitioned into the two combustion chambers; and the gas generating agents and the filtering member are arranged in the combustion chambers, respectively. Also, the igniters are respectively arranged at both ends of the housing.

This enables the gas discharged into the airbag to be controlled by operating the two igniters with time difference, and as such can achieve a two-stage control of expansion of the airbag. Besides, since the housing is formed into the long, cylindrical shape, the gas generator is optimum to inflate and expand the airbag for passenger seat or passenger-side collision.

In addition, in the eleventh invention, the combustion chambers are communicated to each other. This can allow the amount of gas and pressure rise characteristic of the expansion of the airbag to be controlled, to inflate and expand the airbag, as is the case with the first invention.

In addition, the eleventh invention can adopt any of the system that the enclosed space in the housing is partitioned into the two combustion chambers by the partition member, whereby the combustion chambers are communicated to each other through the gas passing holes in the partition member; the system that the enclosed space in the housing is partitioned into the gas passage space and the combustion space by the inner cylindrical member and also the combustion space is partitioned into two combustion chambers.by the partition member, whereby the combustion chambers are communicated to each other through the gas passage space; and the system that the enclosed space in the housing is partitioned into the gas passage space and the combustion space by the inner cylindrical member and the filtering member and also the combustion space is partitioned into two combustion chambers by the partition member, whereby the combustion chambers are communicated to each other through the gas passage space and the filtering member.

In the third through tenth inventions, a convex portion is formed in the partition member, for containing the igniter therein. This enables the igniter to be easily contained in the short, cylindrical, inner casing. Also, the third through tenth inventions adopt the structure that the partition member is positioned in abutment with a step portion of the long, cylindrical, inner casing. This enables the two combustion chambers to be partitioned with a simple structure and also enables the proportion of volume of the two combustion chambers to vary with ease by adjusting the step portion.

Further, in the second through eleventh invention, a cushioning member is arranged in the partition member, for suppressing the transmission of heat of combustion. This enables the transmission of the heat of combustion generated in one of the combustion chambers to be blocked off, which in turn enables the ignition to be surely adjustably controlled by the respective igniters when the gas generating agents in the two combustion chambers are ignited with time difference.

In the fifth through eighth invention and the eleventh invention, the inner cylindrical member is formed of an expanded metal. The expanded metal has a number of gas passage holes that are. projected out toward inside and outside thereof to communicate the inside and the outside to each other, such that the expanded metal layer itself forms the gas passage space. This enables the inner cylindrical member, the outer casing and the filtering member to be disposed in close contact with each other to facilitate the positioning and arrangement of these members.

Further, in the first through eleventh inventions, the filtering member is formed of a metal wire of stocking stitch or a metal wire rod of a crimp mesh. This enables the filtering member to be produced at low costs.

BEST MODE FOR CARRYING OUT THE INVENTION

The description will be given on the embodied forms of the gas generator of the present invention.

The gas generator of the present invention comprises a housing whose interior is partitioned into two combustion chambers, so that the gas generating agents charged in the combustion chambers can be independently ignited by igniters which are arranged in the combustion chambers, respectively, to control the inflation and expansion pattern of the airbag.

In addition, the two combustion chambers are communicated to each other through a filtering member and also the igniters are operated with time difference, whereby the pressure rise and the maximum pressure of the gas discharged from the housing can be controlled.

In the following, description on the gas generator for use in the airbag for driver seat and the gas generator for use in the airbag for passenger seat or passenger-side collision will be given with reference to FIGS. 1–14.

First, the gas generators X1–X3 for use in the airbag for driver seat shown in FIGS. 1–5 will be described.

Figure 1:
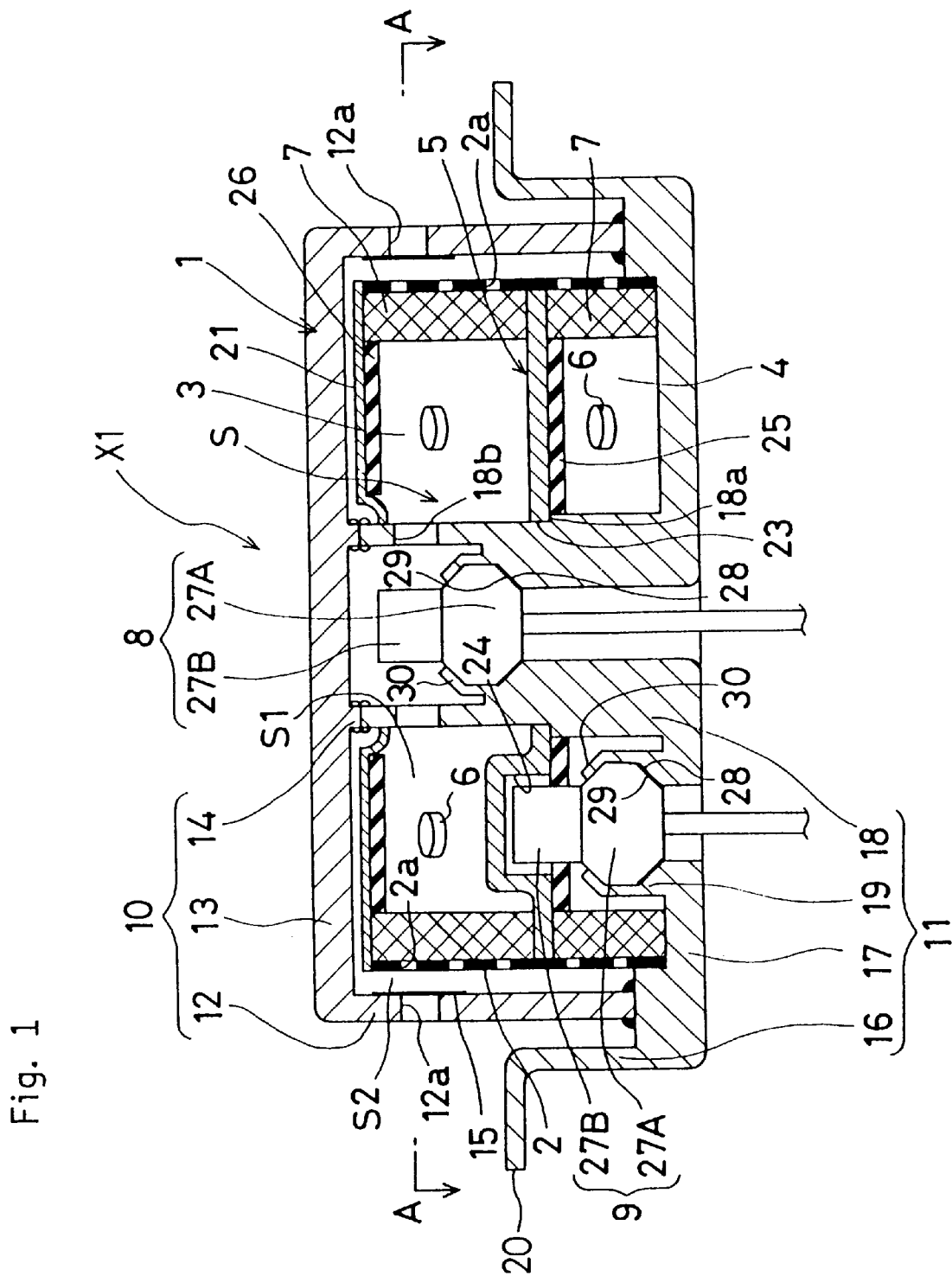
FIG. 1 is a sectional view of a gas generator for a driver seat according to this invention.
Figure 3:
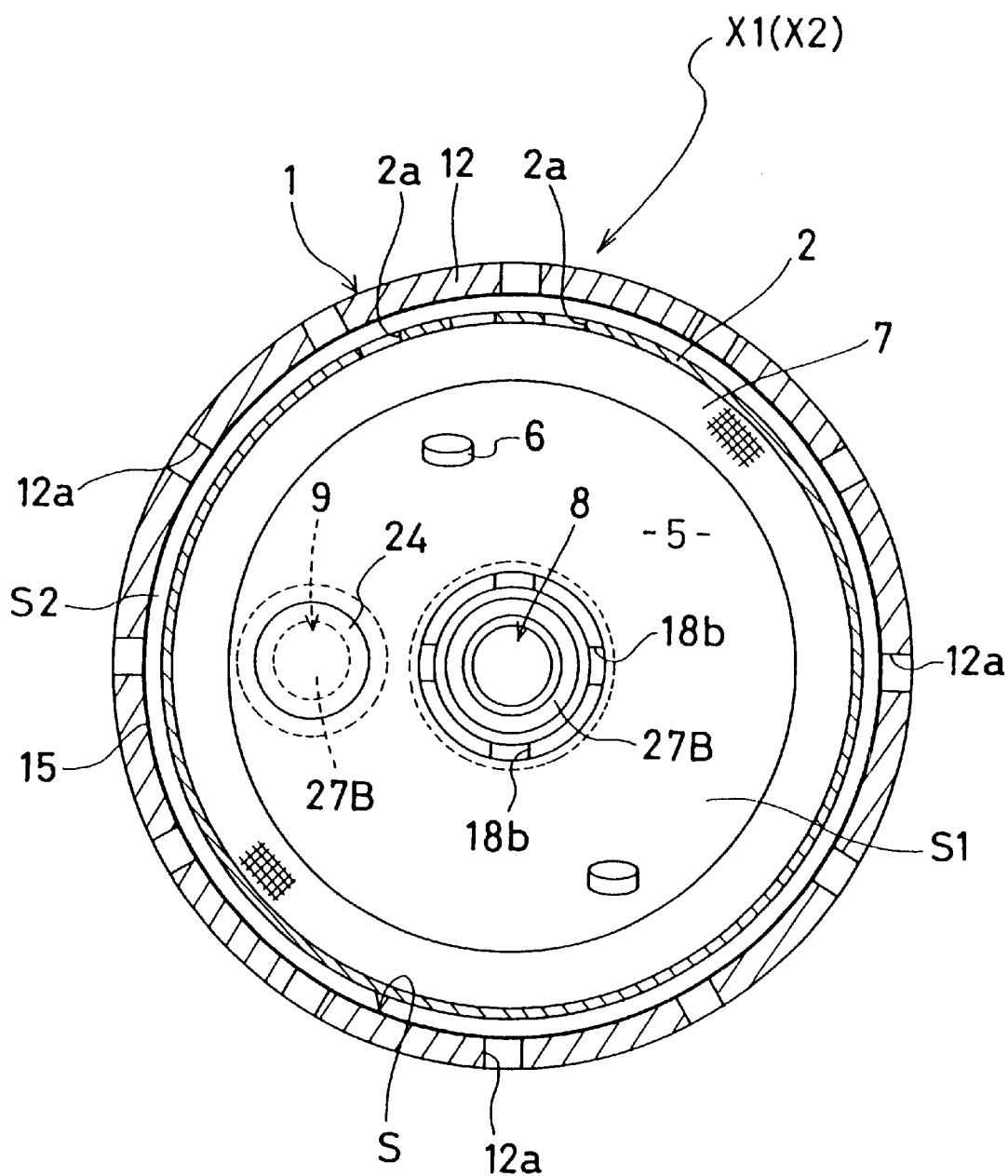
FIG. 3 is a sectional view taken along the line A—A of FIGS. 1 and 2.

The gas generator X1 for use in river seat shown in FIGS. 1 and 3 comprises a short cylindrical housing 1; an inner cylinder member 2 fitted in the housing 1; a partition member 5 to partition an interior of the inner cylinder member 2 into two, upper and lower, combustion chambers 3, 4; gas generating agents 6 and filtering members 7 disposed in the combustion chambers, respectively; and two igniters 8, 9 to allow the gas generating agents 6 in the combustion chambers 3, 4 to be burnt independently of each other.

The housing 1 is so structured that an enclosed space S can be defined in the interior of the housing by an upper container 10 and a lower container 11. The upper container 10 is formed into a capped cylinder form by closing a short, cylindrical, outer casing 12 at an upper end thereof by an upper lid 13 and is molded into one piece from aluminum alloy and the like. The outer.casing 12 has, at the side of the upper lid 13, a number of gas discharging holes 12a opening into the enclosed space S. The gas discharging holes 12a are closed off by a burst plate 15 stuck around the inside of the outer casing 12. The burst plate 15 is formed of e.g. aluminum foil and plays roles of protecting the interior of the housing 1 from moisture and adjusting the inner pressure at the burning. The upper lid 13 has, at its center portion, an inner tubular projection 14 projecting inwardly concentric with the outer casing 12.

The lower container 11 is formed into a bottomed cylinder form by closing a short, cylindrical, flanged casing 16 at an lower end thereof by a lower lid 17 and is molded into one piece from aluminum alloy and the like. The cylindrical flanged casing 16 has, at its upper end, a side flange 20 integrally formed to be bent horizontally in the radial outward direction. The side flange 20 is fitted to a retainer of an airbag module (not shown). The lower lid 17 has, at its center portion, a long, cylindrical inner casing 18 disposed concentric with the cylindrical flanged casing 16 and a short, cylindrical inner casing 19 disposed between the long, cylindrical inner casing 18 and the cylindrical flanged casing 16 which are integrally formed to project into the cylindrical flanged casing 16.

The housing 1 is formed to have a double cylinder structure in which a circumferentially-extending lower end surface of the outer casing 12 of the upper container 10 is abutted with a circumferentially-extending bottom surface in the lower lid 17 at the marginal portion thereof and also a circumferentially-extending lower end surface of the inner tubular projection 14 is abutted with a circumferentially-extending upper end surface of the long, cylindrical inner casing 18, so that they are bonded to each other by welding (e.g. friction welding), to close the outer casing 12 at the upper and lower ends thereof by the respective lids 13 and 17. The housing has the enclosed annular space S formed in the interior thereof. The enclosed space S of the housing 1 is partitioned into an annular combustion space S1 defined between an inner periphery of the inner cylinder member 2 and an outer periphery of the long, cylindrical inner casing 18 and an annular gas passage space S2 defined between the periphery of that annular space and the inner periphery of the outer casing 12 by the inner cylinder member 2 located between the outer casing 12 and the short, cylindrical inner casing 19 and disposed concentric with the long, cylindrical inner casing 18. The inner cylinder member 2 has a number of gas passage holes 2a extending in the axial direction and the circumferential direction to communicate between the spaces S1 and S2. The inner cylinder member 2 extends from the lower lid 17 to a place close to the upper lid 13 and is closed at the upper end portion by a lid member 21 press-fitted onto the periphery of the long, cylindrical inner casing 18.

Figure 6A:
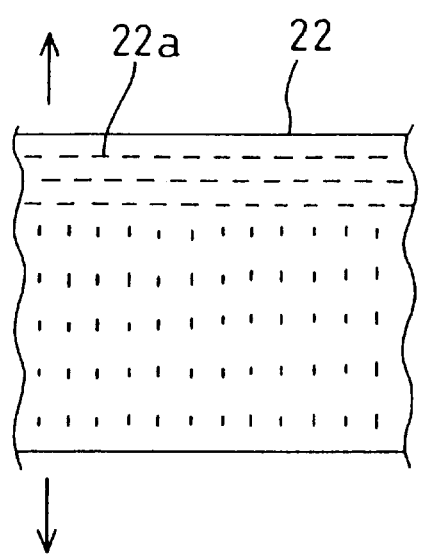
FIG. 6 is a diagram showing an expanded metal of which an inner cylindrical member is formed.
Figure 6B:
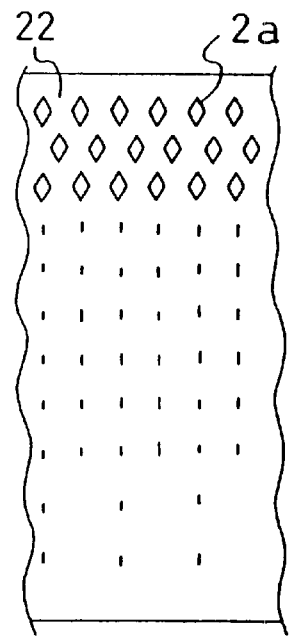
Figure 6C:
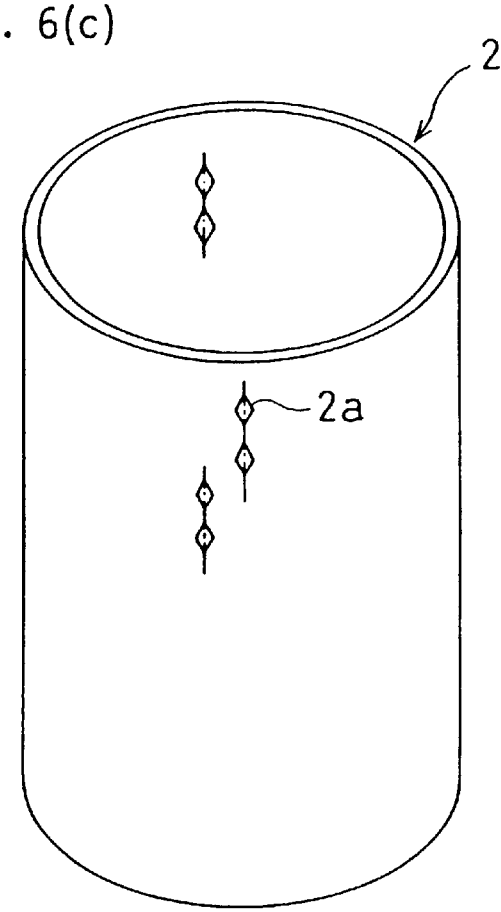

The inner cylindrical member 2 is produced by using an expanded metal whose base metal 22 having a large number of slits 22a spaced apart at given intervals as shown in FIG. 6(a) is pulled to open a number of gas passage holes 2a shown in FIG. 6(b). The inner cylindrical member 2 is produced by forming the expanded metal having a predetermined length and a predetermined width into a cylindrical shape and then fixing it at both ends by spot welding and the like, as shown in FIG. 6(c). A stainless steel sheet or a steel sheet other than stainless steel is used as the base metal 22.

Figure 7:
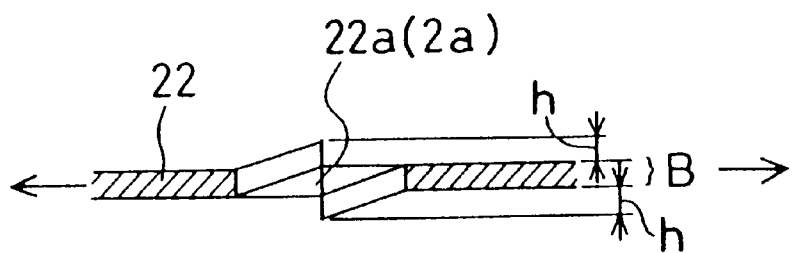
FIG. 7 is a sectional view showing the tensioned state of the expanded metal shown in FIG. 6.

When the inner cylindrical member 2 is produced from the expanded metal, the expanded metal around the margins of the slits 22a is cambered from a flat surface B of the base metal 22 toward inside and outside by only a height h, as shown in FIG. 7, when expanded in the directions indicated by the arrows shown in FIG. 6(a). As a result of this, the inner cylindrical member 2 has the structure that a number of gas passage holes 2a are formed around its periphery which project only a height h around the margins of the slits 22a to open circumferentially and extend axially and also communicate to each other in the circumferential direction.

When the inner cylindrical member 2 made of the expanded metal is fitted in the housing 1, even when the inner cylindrical member 2 is inflated and deformed by the high-pressure and high-temperature gas produced by the burning of the gas generating agents 6 in the combustion chambers 3, 4, the gas can be allowed to pass from the number of gas passage holes 2a projecting only the height h toward inside and outside toward the gas discharging holes 12a. Thus, in the case where the inner cylindrical member 2 is formed of the expanded metal, even when the inner cylindrical member 2 is disposed to be in contact with the inner periphery of the outer casing 12, the annular space continuous to the inner periphery of the outer casing 12 can be formed in the form of the gas passage space S2.

It is to be noted that the inner cylindrical member 2 is not limited to the one produced from the expanded metal. It may be produced by a perforated metal sheet (e.g. a punching plate) with a number of spaced part gas passage holes 2a being formed in the cylindrical form and fixedly jointed at the both ends by a proper jointing method such as spot welding. For the inner cylindrical member 2 formed of the punching plate, it is necessary to provide a spacing to partition the gas passage space S2 between the outer periphery of the inner cylindrical member and the inner periphery of the outer casing 12.

The combustion space S1 in the inner cylindrical member 2 is partitioned into two upper and lower combustion chambers 3, 4 by the partition member 5 disposed between the upper lid 13 and the lower lid 17 to be generally in parallel with those lids. The partition member 5 is formed into a disk-like form to be freely press-fitted into the inner cylindrical member 2 and has, at its center portion, a through hole 23 for the long, cylindrical inner casing 18 to extend through. The partition member 5 has a cup-like convex portion 24 that is eccentrically positioned with respect to the through hole 23 and projects to cover the short, cylindrical inner casing 19.

The partition plate 5 is fitted from a mouth of the lower container 11 into the inside of the inner cylindrical member 23 with the through hole 23 fitted onto the long, cylindrical inner casing 18, and is positioned in abutment with a step portion 18a of the long, cylindrical inner casing 18. The partition plate 5 fitted partitions the housing 1 into the two, upper and lower, combustion chambers 3, 4 in the axial direction of the housing 1 in the state in which an opening portion of the convex portion 24 confronts the short, cylindrical inner casing 19. The combustion chambers 3, 4 are packed with the gas generating agents 6 and the filtering members 7 are arranged to surround them.

The filtering members 7 in the combustion chambers 3, 4 are formed into a cylindrical form to fit into the inner cylindrical member 2. The filtering member 7 in the upper combustion chamber 3 is fitted in the inner cylindrical member 2 and extends from the partition member 5 into abutment with the lid member 21. The filtering member 7 in the lower combustion chamber 4 is fitted in the inner cylindrical member 2 and extends from the lower lid 17 into abutment with the partition member 5.

Figure 8A:
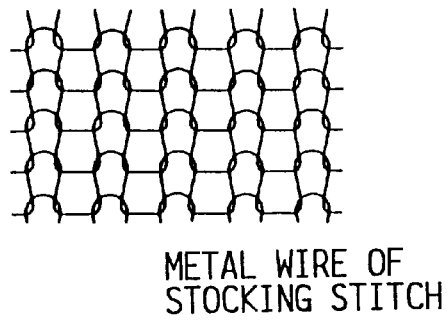
FIG. 8 is a diagram showing a metal wire of stocking stitch of which the filtering member is formed or a metal wire rod of a crimp mesh.
Figure 8B:
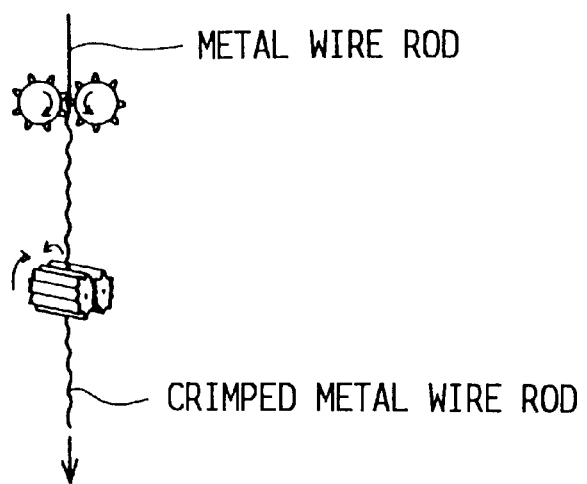
Figure 8C:
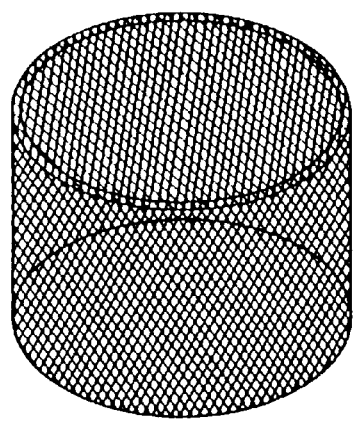

The filtering members 7 are preferably produced at a low price by pressing a metal wire of stocking stitch shown in FIG. 8(a) or aggregation of crimped metal wire rods shown in FIG. 8(b) into cylindrical shape as shown in FIG. 8(c). Thus, the combustion chambers 3, 4 are so structured as to communicate to each other through their respective filtering members 7, the gas passage holes 2a of the inner cylindrical member 2 and the gas passage space S2.

Disposed between the gas generating agents 6 in the lower combustion chamber 4 and the partition member 5 is a cushioning member 25 abutting with the partition member 5. The cushioning member 25 doubles as means for preventing degradation of the gas generating agents 6 resulting from vibration and as heat insulating material for suppressing heat transfer between the combustion chambers 3 and 4. Elastic material having the heat insulating function, such as ceramic fibers, should preferably be used as the cushioning member 25. Disposed between the gas generating agents 6 in the upper combustion chamber 3 and the lid member 21 is a cushioning member 26 abutting with the lid member 21. The cushioning member 26 also has the capability of preventing degradation of the gas generating agents 6 resulting from vibration. Elastic material, such as silicon rubber and silicon foam, is preferably used as the cushioning member 26, though those having the heat insulating function, such as ceramic fibers, may be used.

The igniters 8, 9 are each composed of a holding portion 27A and an igniting portion 27B disposed at a front end of the holding portion 27A and are separately disposed in an accommodating space formed by the inner tubular projection 14 and the long, cylindrical inner casing 18 and in an accommodating space formed by the convex portion 24 of the partition member 5 and the short, cylindrical inner casing 19, respectively. The igniters. 8, 9 are in air-tight contact with tapered step portions 28 formed in the long, cylindrical inner casing 18 and in the short, cylindrical inner casing 19, respectively, through sealing members 29 (rubber sheet) and are fixedly swaged by folding their swaging portions 30 at the front ends of the inner casings 18, 19 inside.

The igniting portion 27B of the igniter 8 in the long, cylindrical inner casing 18 is projected out into the accommodating space so that the flame produced by the ignition of the igniting portion 27B can be spurted into the upper combustion chamber 3 through a number of fire guide holes 18b in the long, cylindrical inner casing 18. The igniting portion 27B of the igniter 9 in the short, cylindrical inner casing 19 is extended through the cushioning member 25 into the convex portion 24 so that the flame produced by the ignition of the igniting portion 27B can be spurted into the lower combustion chamber 4 through a gap between the partition member 5 and the short, cylindrical inner casing 19. The igniters 8, 9 are ignited under control of the collision detection signals from a collision sensor (not shown).

Next, operation of the gas generator X1 for driver seat will be described.

When automobile collision is detected by the collision sensor, only the igniter 8 on the upper combustion chamber 3 side is brought into operation to ignite the igniting portion 27B. The ignition flame of the igniting portion 27B is spurted into the upper combustion chamber 3 from the fire guide holes 18b to force the gas generating agents 6 to be ignited and burnt to thereby produce high temperature gas. Then, transmission of the combustion heat generated in the upper combustion chamber 3 is suppressed (slowed down) by the heat insulating function of the cushioning member 25, so that the gas generating agents 6 in the lower combustion chamber 4 are prevented from being ignited concurrently.

The high temperature gas generated in the upper combustion chamber 3 flows in the filtering member 7 for slag collection and cooling of the gas thereat and thereafter flows from the gas passage holes 2a in the inner cylindrical member 2 into the gas passage space S2. Then, when the gas pressure increases with the combustion in the upper combustion chamber 3 and reaches a predetermined pressure, the burst plate 15 is broken, so that clean gas uniformed in the gas passage space S2 is discharged from the gas discharging holes 12a into the airbag.

At that time, a part of the high temperature gas generated in the upper combustion chamber 3 flows into the lower combustion chamber 4 through the filtering member 7, the inner cylindrical member 2 and the gas passage space S2. Thus, the combustion in the upper combustion chamber 3 is effected with a whole volume (enclosed space S) of the housing 1 including the lower combustion chamber 4 communicating to the upper combustion chamber through the gas passage space S2 and others. This produces the pressure characteristic that the pressure rise is suppressed only by the extent corresponding to the increased volume (the volume of the lower combustion chamber 4). In addition, when the gas passes through the inner cylindrical member 2 on the lower combustion chamber 4 side and the filtering member 7, the heat quantity of the gas flowing into the lower combustion chamber 4 is absorbed (cooled) and the temperature of the gas decreases and, thereafter, the gas is spurted out from the filtering member 7 into the lower combustion chamber 4. This prevents immediate spontaneous ignition of the gas generating agents 6 in the lower combustion chamber 4.

Then, the airbag is inflated and expanded with a modest and weak tension by a small amount of clean gas that is suppressed (slowed down) in pressure rise. In this sense, a cross section area of the gas passage space S2 for the gas to pass through is adjusted to control a flow rate of the gas to flow into the lower combustion chamber 4 so that the airbag can be inflated and expanded by a small amount of gas adapted to have a proper pressure rise characteristic.

Sequentially, when the igniter 9 in the lower combustion chamber 4 is operated with small time difference from after the start of combustion of the upper combustion chamber 3, the gas generating agents 6 in the lower combustion chamber 4 are forcibly ignited to initiate the combustion, so as to produce high temperature gas. The high temperature gas produced in the lower combustion chamber 4 is flown into the gas passage space S2 through the gas passage holes 2a in the inner cylindrical member 2 and then is discharged from the gas discharging holes 12a into the airbag, as is the case with the upper combustion chamber 3. Thus, the airbag is inflated and expanded rapidly by a large amount of clean gas discharged from the both combustion chambers 3, 4.

At that time, the combustion in the lower combustion chamber 4 is effected with the whole volume (enclosed space S) of the housing 1 including the lower combustion chamber communicating to the upper combustion chamber 3 through the gas passage space S2 and others, as is the case with the upper combustion chamber 3. As a result of this, the clean gas discharged into the airbag has the pressure rise characteristic produced by the addition of the gas pressure resulting from the combustion in the lower combustion chamber 4 to the gas pressure of the whole housing 1 at the time of operation of the igniter 9 (the gas pressure resulting from the combustion in the upper combustion chamber 3). The airbag is inflated and expanded rapidly with equilibrium pressure of these pressures as the maximum pressure Pmax.

In this sense, with the increased small time difference between the igniters 8 and 9, the gas burnt in the upper combustion chamber 3 can spread in volume throughout the whole housing 1 including the lower combustion chamber 4, and as such can provide a moderate pressure rise characteristic for the gas discharged into the airbag and also enables the maximum pressure Pmax to be kept down. Thus, the pressure rise characteristic of the gas discharged into the airbag and the maximum pressure Pmax can be controlled by appropriately changing the small time difference with which the igniters 8, 9 are operated, so that when the airbag is inflated and expanded, the shock to riders can be absorbed.

When the combustion in the upper combustion chamber 3 is initiated, a part of the high temperature gas flows into the lower combustion chamber 4 through the gas passage space S2. In the initial stage in which the combustion is initiated, the flowing high temperature gas is cooled down while it passes through the inner cylindrical member 2 on the lower combustion chamber 4 side and the filtering member 7 from the gas passage space S2, so that the gas generating agents 6 in the lower combustion chamber 4 are not led to the spontaneous ignition. However, as the combustion in the upper combustion chamber 3 progresses and the temperature of the filtering member 7 in the lower combustion chamber 4 increases, the gas generating agents 6 in the lower combustion chamber 4 are finally led to the spontaneous ignition.

Accordingly, for forcibly igniting the gas generating agents 6 in the combustion chambers 3, 4 with their respective igniters 8, 9 with small time difference, it is necessary to delay the time for the gas generating agents 6 in the lower combustion chamber 4 to be spontaneously ignited by the heat quantity of the high temperature gas flowing into the lower combustion chamber 4 by a more time difference than the small time difference.

In this sense, it is necessary to control the quantity of combustion gas (heat quantity) flowing from the upper combustion chamber 3 into the lower combustion chamber 4. The control of the quantity of combustion gas can be effected by adjusting the cross section area of the gas passage space S2 for the gas to pass through.

The igniter 8, 9 are not necessarily operated with the small time difference but may be selectively operated to fitly meet the patterns of automobile collision.

For example, in the case of critical collision of automobile, such as frontal clash or clash from a diagonal side to the front, at high speed, the igniters 8, 9 are operated concurrently. Accordingly, the airbag can be inflated and expanded rapidly by the gas having the rapid pressure rise characteristic produced by a large amount of gas produced in the combustion chambers 3, 4, and as such can increase the maximum pressure Pmax of the gas pressure.

In the case of medium collision, the igniters 8, 9 are operated with the small time difference. In this case, the airbag is inflated and expanded moderately by a small amount of gas that is suppressed in pressure rise in the initial stage of expansion and then is inflated and expanded rapidly with the small time difference by a large amount of gas having the rapid pressure rise characteristic. As a result of this, the maximum pressure Pmax of the gas is suppressed, as compared with the case of the frontal clash at high speed.

Further, in the case of light bump or collision, only one igniter 8 is operated so that the gas generating agents 6 in the upper combustion chamber 3 can be forcibly ignited by the igniter 8 and also the gas generating agents 6 in the lower combustion chamber 4 can be spontaneously ignited by the high temperature gases flowing into the lower combustion chamber 4. The gas produced by the spontaneous ignition is discharged into the airbag with a level of time difference that does not contribute to the protection of riders, so that the airbag is inflated and expanded moderately. Even when only one igniter 8 is operated, the spontaneous ignition enables the gas generating agents 6 in the lower combustion chamber 4 to be burnt out completely.

Thus, in the gas generator X1, the maximum pressure of a very wide range can be adjusted depending on the forcing ignition of he igniters 8, 9.

Thus, according to the gas generator X1 for driver seat, the igniters 8, 9 are operated with such small time difference as to control the expansion of the airbag in such a manner that the airbag is inflated and expanded moderately by a small amount of gas which is generated in the upper combustion chamber 3 only and suppressed in pressure rise in the initial stage of expansion and thereafter is inflated and expanded rapidly by a large amount of gas with increased pressure generated from the both combustion chambers 3, 4 (the amount of gas discharged into the airbag and the gas pressure can be controlled in two stages).

Hence, even when a rider is seated immediately behind the steering wheel, the airbag can be prevented from being inflated and expanded rapidly in the initial expansion stage to give the rider a shock and can fulfill its intended function to protect the rider.

When the inner cylindrical member 2 is produced from the expanded metal, the projections projecting from the reference plane B of the base metal 22 by only a height h as shown in FIG. 7 are formed in the expanded metal at the inside and outside thereof by the cambers produced when forming the apertures. This enables the gas passage space S2 to be integrally formed in the expanded metal itself, even when the inner cylindrical member 2 made of the expanded metal is disposed in contact with the inner periphery of the outer casing 12 and the outer periphery of the filtering member 7.

Figure 2:
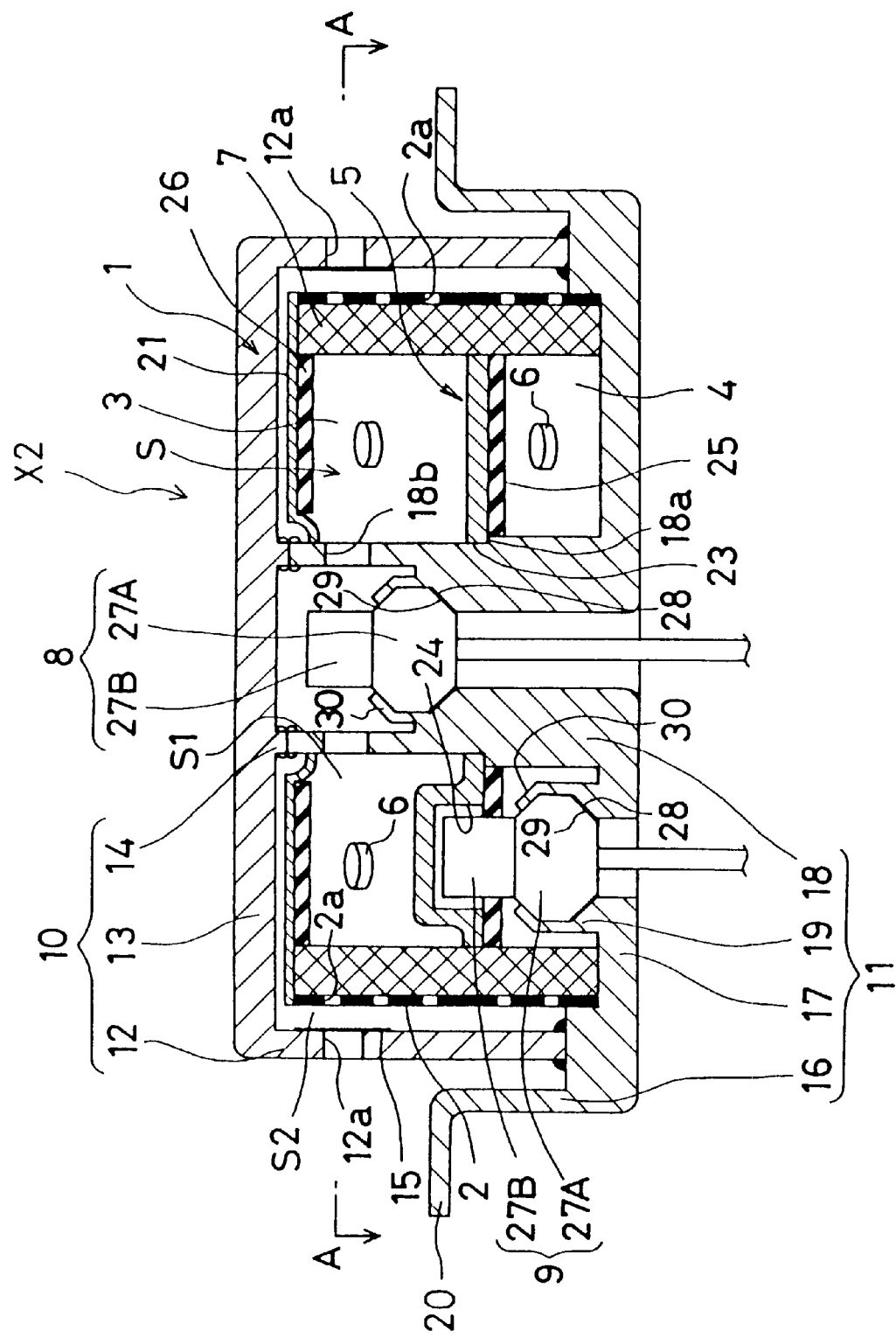
FIG. 2 is a sectional view of another gas generator for driver seat.

Referring now to FIGS. 2 and 3, the gas generator X2 for driver seat will be described.

The gas generator X2 of FIGS. 2 and 3 is different from the gas generator X1 of FIG. 1 in that the filtering member 7 is arranged to extend through the both combustion chambers 3 and 4. Like reference characters refer to corresponding to members of FIGS. 1 and 3 and repetition of description thereon is omitted.

In FIG. 2, the filtering member 7 is fitted in the inner cylindrical member 2 to extend from the lower lid 17 of the lower container 11 to the lid 21. The partition member 5 is fitted from the mouth of the lower container 11 into the inside of the filtering member 7, with the through hole 23 fitted onto the long, cylindrical inner casing 18, and is positioned in abutment with the step portion 18a of the long, cylindrical inner casing 18. The partition member 5 fitted partitions the housing 1 into the two, upper and lower, combustion chambers 3, 4 in the axial direction of the housing 1 in the state in which the opening portion of the convex portion 24 confronts the short, cylindrical inner casing 19. The combustion chambers 3, 4 are packed with the gas generating agents 6. The combustion chambers 3, 4 are so structured as to communicate to each other through the filtering member 7, or the filtering member 7 and the gas passage space S2.

Next, operation of the gas generator X2 for driver seat will be described.

When automobile collision is detected by the collision sensor, only the igniter 8 on the upper combustion chamber 3 side is brought into operation. Then, the high temperature gas generated in the upper combustion chamber 3 is subjected to the slag collection and the cooling in the filtering member 7 and is uniformed in the gas passage space S2. Thereafter, it is started being discharged into the airbag, as is the case with FIG. 1.

At that time, a part of the combustion gas generated in the upper combustion chamber 3 flows into the lower combustion chamber 4 through the filtering member 7 and others. Thus, the airbag is inflated and expanded with a modest and weak tension by a small amount of clean gas which is generated in the upper combustion chamber 3 only and suppressed (slowed down) in pressure rise. The proper pressure rise characteristic is provided by adjusting the cross section area of the filtering member 7 and the gas passage space S2 for the gas to pass through, as is the case with the gas generator X1 of FIG. 1.

The part of the high temperature gas flowing into the filtering member 7 flows into the lower combustion chamber 4. While the part of the gas passes through the filtering member 7 on the lower combustion chamber 4 side, the heat quantity of the gas is absorbed (cooled) and the temperature of the gas decreases and, thereafter, the gas is spurted out into the lower combustion chamber 4. This prevents immediate spontaneous ignition of the gas generating agents 6 in the lower combustion chamber 4.

Sequentially, when the igniter 9 in the lower combustion chamber 4 is operated with small time difference after the start of combustion of the upper combustion chamber 3, the gas generating agents 6 in the lower combustion chamber 4 are started burning and then the airbag is transferred to rapid inflation and expansion by a large amount of clean gas discharged from the both combustion chambers 3, 4, as is the case with FIG. 1.

At that time, the combustion in the lower combustion chamber 4 is effected with the whole volume of the housing 1 including the lower combustion chamber communicating to the upper combustion chamber 3 through the filtering member 7 and others, as is the case with the upper combustion chamber 3. As a result of this, the clean gas discharged into the airbag has the pressure rise characteristic produced by the addition of the gas pressure resulting from the combustion in the lower combustion chamber 4 to the gas pressure of the whole housing 1 at the time of operation of the igniter 9, and as such can allow the airbag to be inflated and expanded rapidly with equilibrium pressure of these gas pressures as the maximum pressure Pmax. As is the case with the gas generator X1 of FIG. 1, the specified pressure rise characteristic and the maximum pressure Pmax can be provided to meet the patterns of automobile collision by appropriately adjusting the time difference with which the igniters 8, 9 are operated.

Thus, according to the gas generator X2 for driver seat, the expansion of the airbag can be controlled with ease, as is the case with FIG. 1, to fulfill the intended function of the airbag securely.

When the gas generator is so constructed that the slag collection and the cooling of the combustion gas generated in the combustion chambers 3, 4 are effected by the filtering member 7 of a one-piece design, component counts can be reduced and thus manufacturing costs can be reduced, as compared with the gas generator X1 of FIG. 1 in which the filtering members 7 are arranged in the combustion chambers 3, 4, respectively.

Figure 4:
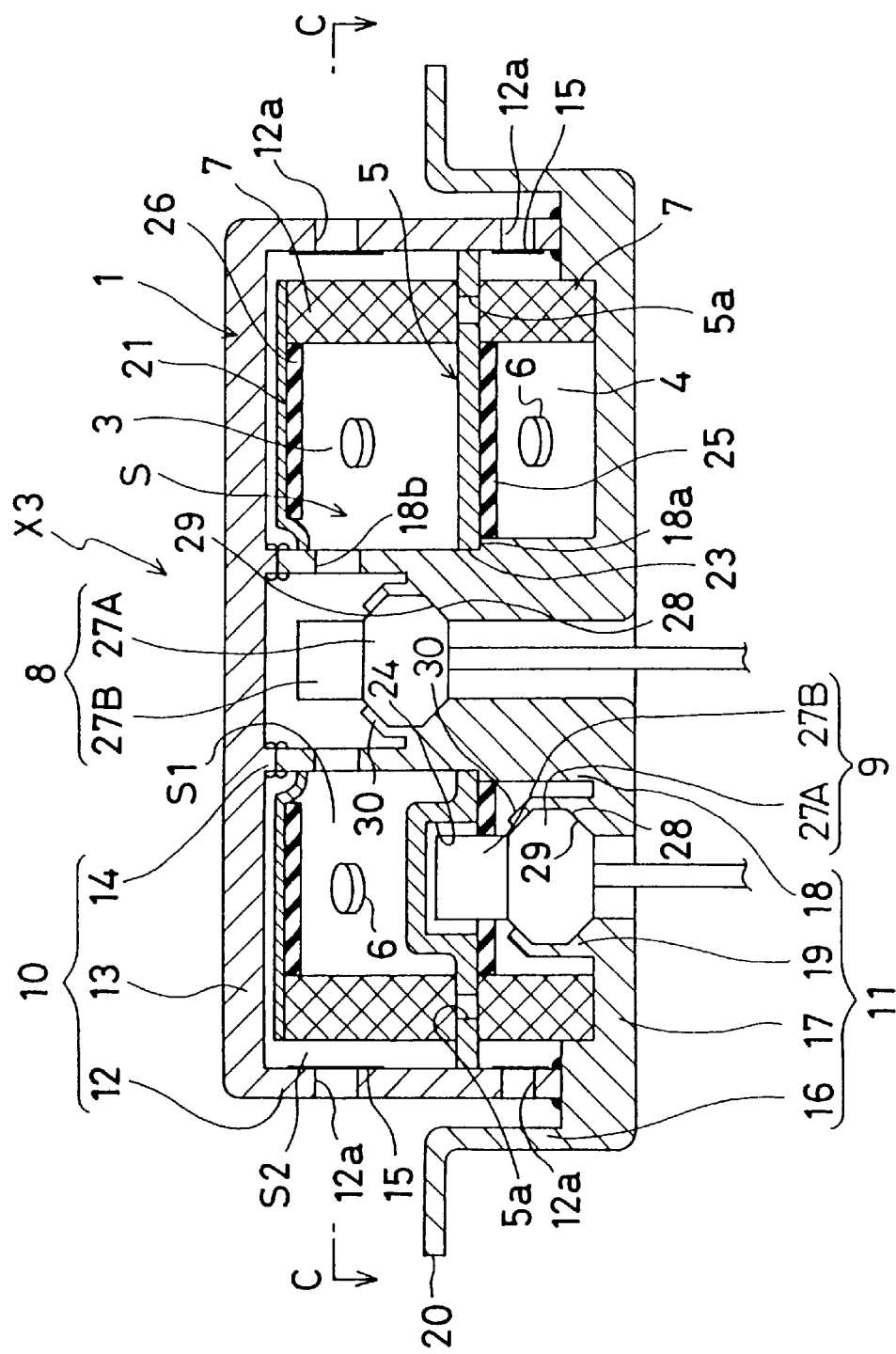
FIG. 4 is a sectional view showing further another gas generator for driver seat.
Figure 5:
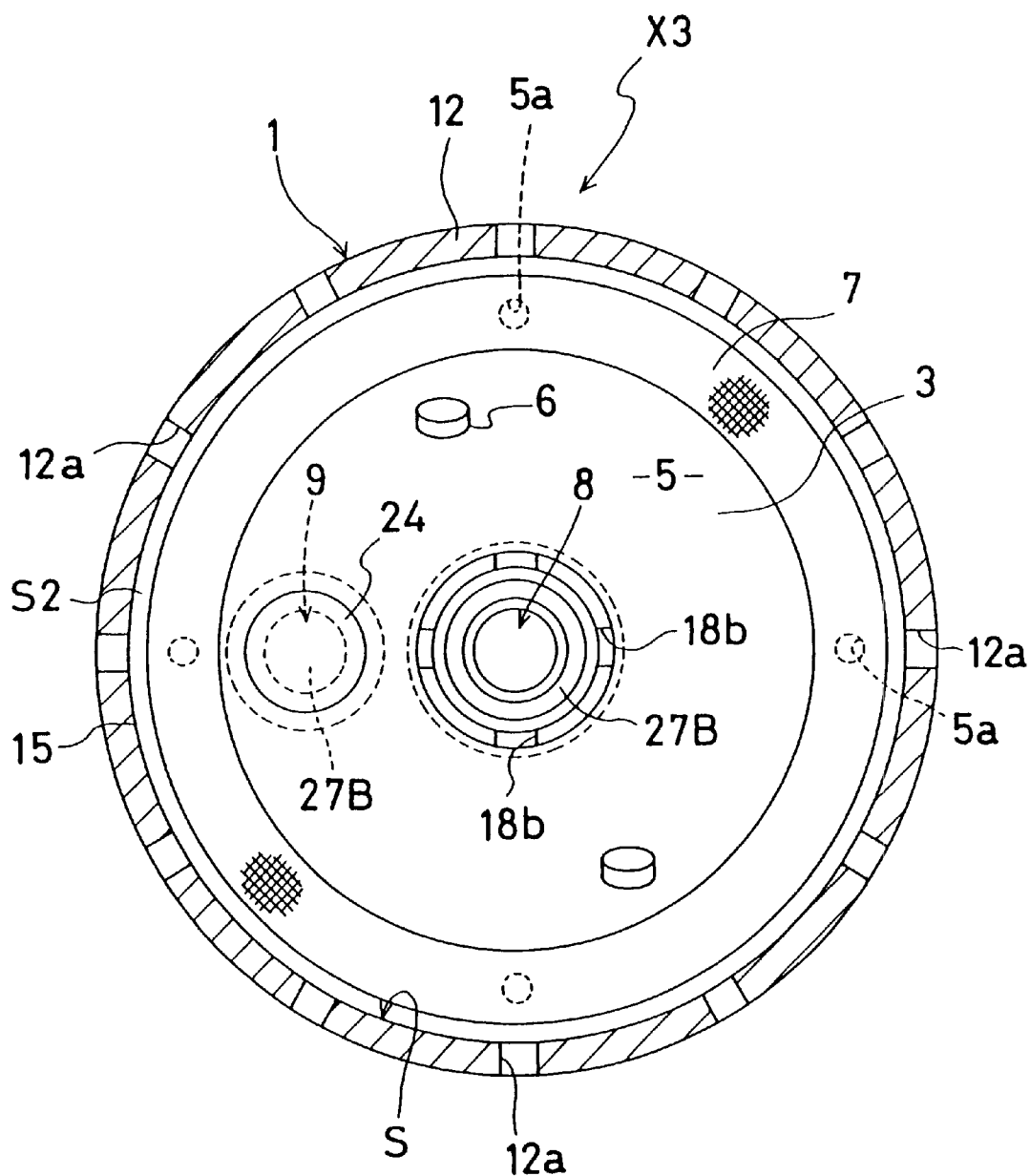
FIG. 5 is a sectional view taken along the line C—C of FIG. 4.

Referring now to FIGS. 4 and 5, the gas generator X3 for driver seat will be described.

The gas generator X3 of FIGS. 4 and 5 is mainly different from the gas generator X1 of FIG. 1 in that the partition member 5 is fitted in around the inside of the outer casing 12, without the inner cylindrical member 2 being used, and thereby the two, upper and lower, combustion chambers 3, 4 are partitioned, and also the partition member 5 forms therein the gas passing holes 5a through which the combustion chambers 3, 4 are communicated to each other. Like reference characters refer to corresponding to members of FIGS. 1 and 3 and repetition of description thereon is omitted.

In FIGS. 4 and 5, the partition member 5 is fitted from the mouth of the lower container 11 into the inside of the outer casing 12, with the through hole 23 fitted onto the long, cylindrical inner casing 18, and is positioned in abutment with the step portion 18a of the long, cylindrical inner casing 18. The partition member 5 fitted partitions the housing 1 into the two, upper and lower, combustion chambers 3, 4 in the axial direction of the housing 1 in the state in which the opening portion of the convex portion 24 confronts the short, cylindrical inner casing 19. The partition member 5 has a plurality of gas passing holes 5a formed around the outside thereof. As shown in FIG. 5, four gas passing holes 5a are spaced apart at an angle of 90 degree in the circumferential direction of the housing 1. The gas passing holes extend through the partition member 5 in the axial direction of the housing 1 so that the combustion chambers 3, 4 can be communicated to each other through the gas passing holes. The combustion chambers 3, 4 are packed with the gas generating agents 6 and the filtering members 7 are arranged to surround them.

The filtering members 7 extend from the lower lip 17 to the partition member 5 and from the partition member 5 to the lid member 21 and are disposed in the combustion chambers 3, 4, respectively. These filtering members 7 cover over the gas passing holes 5a at the ends thereof on the partition member 5 side and define the gas passage space S2 between the periphery of the filtering members and the inner periphery of the outer casing 12. Thus, the combustion chambers 3, 4 are so structured as to communicate to each other through the filtering members 7 and the gas passing holes 5a. The outer casing 12 of the upper container 10 forms therein a number of gas discharging holes 12a through which the gas passage space S2,of the combustion chambers 3, 4 and the exterior are communicated to each other.

Next, operation of the gas generator X3 for driver seat will be described.

When automobile collision is detected by the collision sensor, only the igniter 8 on the upper combustion chamber 3 side is brought into operation. Then, the combustion gas generated in the upper combustion chamber 3 is subjected to the slag collection and the cooling in the filtering members 7 and then is uniformed in the gas passage space S2. Thereafter, it is started being discharged into the airbag, as is the case with FIG. 1.

At that time, a part of the combustion gas generated in the upper combustion chamber 3 flows into the lower combustion chamber 4 through the filtering members 7 and the gas passing holes 5a. Thus, the airbag is inflated and expanded with a modest and weak tension by a small amount of clean gas generated in the upper combustion chamber 3 only and suppressed (slowed down) in pressure rise. The proper pressure rise characteristic is provided by adjusting the cross section area of and the number of apertures of the gas passing holes 5a, as is the case with the gas generator X1 of FIG. 1.

Sequentially, when the igniter 9 in the lower combustion chamber 4 is operated with small time difference after the start of combustion of the upper combustion chamber 3, the gas generating agents 6 in the lower combustion chamber 4 are started burning and then the airbag is transferred to rapid inflation and expansion by a large amount of clean gas discharged out from the both combustion chambers 3, 4, as is the case with FIG. 1.

At that time, the combustion in the lower combustion chamber 4 is effected with the whole volume of the housing 1 including the lower combustion chamber communicating to the upper combustion chamber 3 through the gas passing holes 5a and others, as is the case with the upper combustion chamber 3. As a result of this, the clean gas discharged into the airbag has the pressure rise characteristic produced by the addition of the gas pressure resulting from the combustion in the lower combustion chamber 4 to the gas pressure of the whole housing 1 at the time of operation of the igniter 9, and as such can allow the airbag to be inflated and expanded rapidly with equilibrium pressure of these gas pressures as the maximum pressure Pmax. As is the case with the gas generator X1 of FIG. 1, the specified pressure rise characteristic and the maximum pressure Pmax can be provided to meet the patterns of automobile collision by appropriately adjusting the time difference with which the igniters 8, 9 are operated.

Thus, according to the gas generator X3 for driver seat, the expansion of the airbag can be controlled with ease, as is the case with FIG. 1, to fulfill the intended function of the airbag securely.

The gas generators X1–X3 for driver seat as illustrated take the pattern that after the gas generating agents 6 in the upper combustion chamber 3 are burnt, the gas generating agents 6 in the lower combustion chamber 4 are burnt, but this pattern is not of restrictive. The pattern may be taken that after the gas generating agents 6 in the lower combustion chamber 4 are burnt, the gas generating agents 6 in the upper combustion chamber 3 are burnt. Further, modification may also be made by rendering the combustion chambers 3, 4 different in volume so that one of the combustion chambers can be made larger in volume than the other and also starting the combustion from the combustion chamber of a larger volume.

Next, the gas generators Y1–Y3 for use in the airbag for passenger seat or passenger-side collision shown in FIGS. 9–14 will be described.

Figure 9:
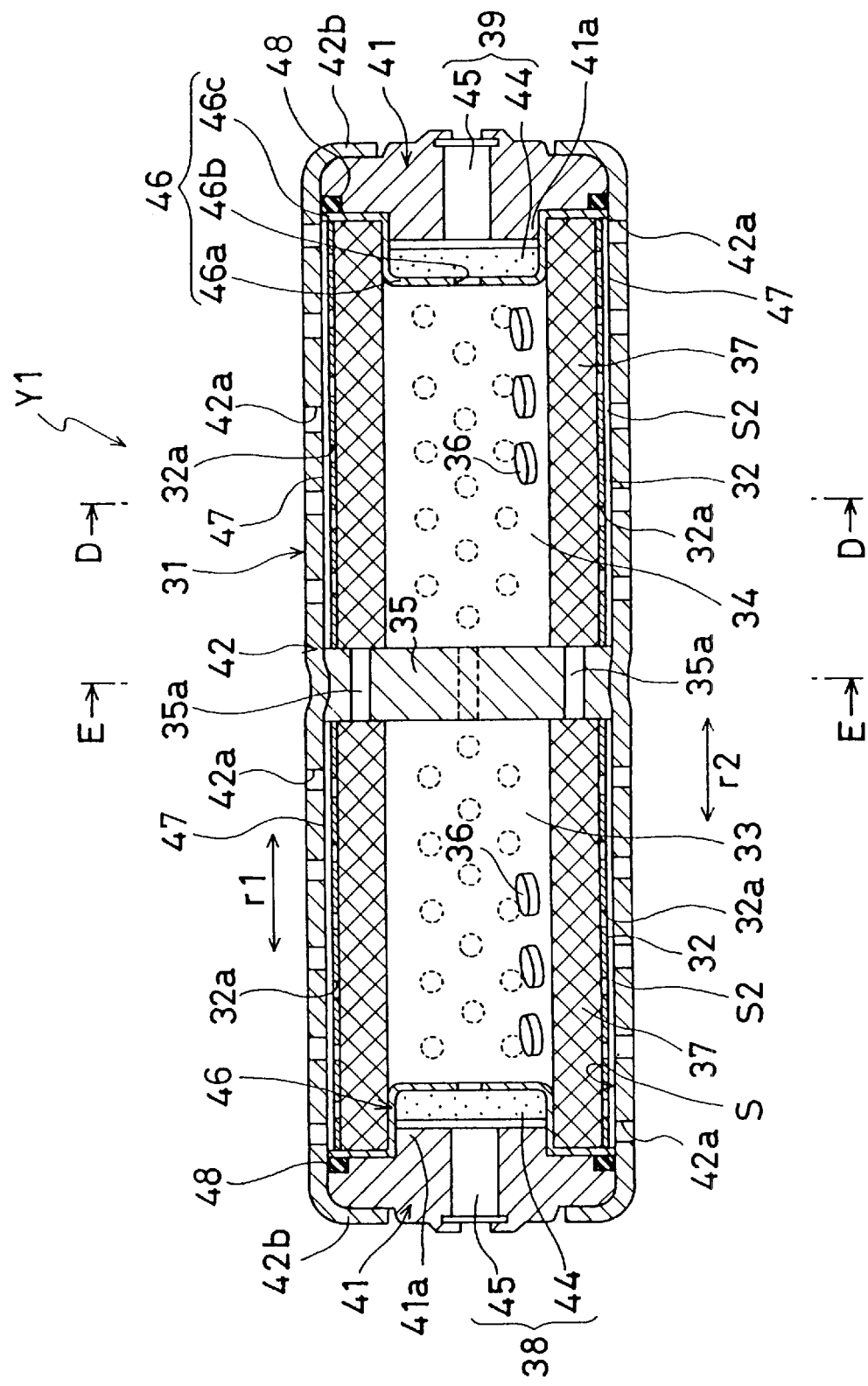
FIG. 9 is a sectional view showing a gas generator for passenger seat or for passenger-side collision according to this invention.

The gas generator Y1 for use in the airbag for passenger seat or passenger-side collision shown in FIGS. 9 and 10 comprises an elongated cylindrical housing 31; a partition member 35 for partitioning an interior of the housing 31 into two, left and right, combustion chambers 33, 34; gas generating agents 36, filtering members 37 and inner cylindrical members 32 which are disposed in the combustion chambers 33, 34, respectively; and igniters 38, 39 to allow the gas generating agents 36 in the combustion chambers 33, 34 to be burnt independently of each other.

The housing 31 is composed of an elongated cylindrical outer casing 42 having openings at the both ends thereof and two lid members 41 for closing the openings of the outer casing 42. The housing 31 is so structured as to form an enclosed space S in the interior thereof when the lid members 41 is fitted in the outer casing 42 from the openings at the ends thereof and projections 42b projecting out from both sides of the outer casing 42 are folded radially inwardly.

Figure 10A:
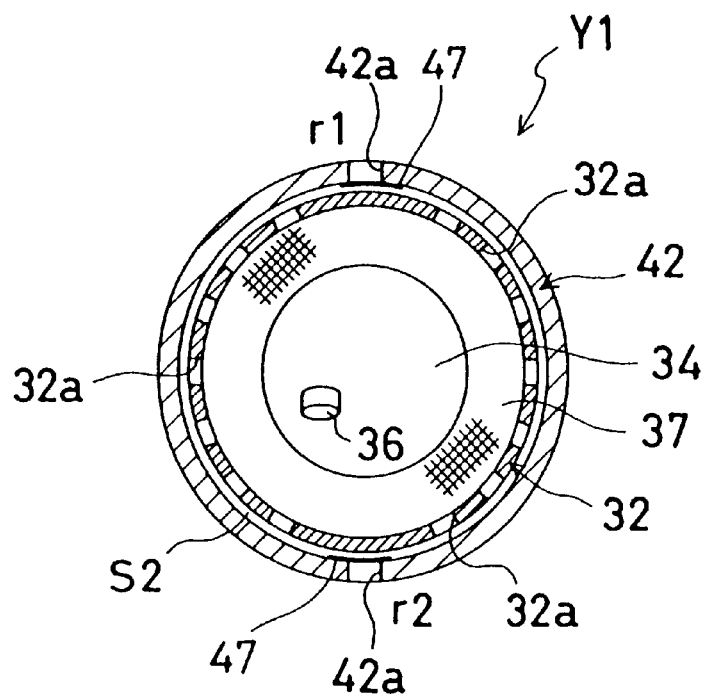
FIG. 10 is a sectional view taken along the lines D—D and E—E of FIG. 9.

The outer casing 42 has, around its periphery, a number of gas discharging holes 42a communicating to the airbag for a passenger seat (not shown). As shown in FIG. 10(a), the gas discharging holes 42a are formed on an axially extending straight line with spaced apart at 180 degree circumferentially of the housing 31, to form lines of two gas holes r1, r2. The gas discharging holes 42a on the lines of two gas holes r1, r2 are spaced apart in sequence at given intervals along the axial direction of the outer casing 42 are closed off by strip-like burst plates 47 stuck around the inside of the outer casing 42. The burst plates 47 are formed, for example, of aluminum foil and have length and width enough to close off the gas discharging holes 42a for every line of gas holes r1, r2. A sheet of burst plate to be stuck around the inside of the outer casing 42 is not excluded from the burst plates 47.

Figure 10B:
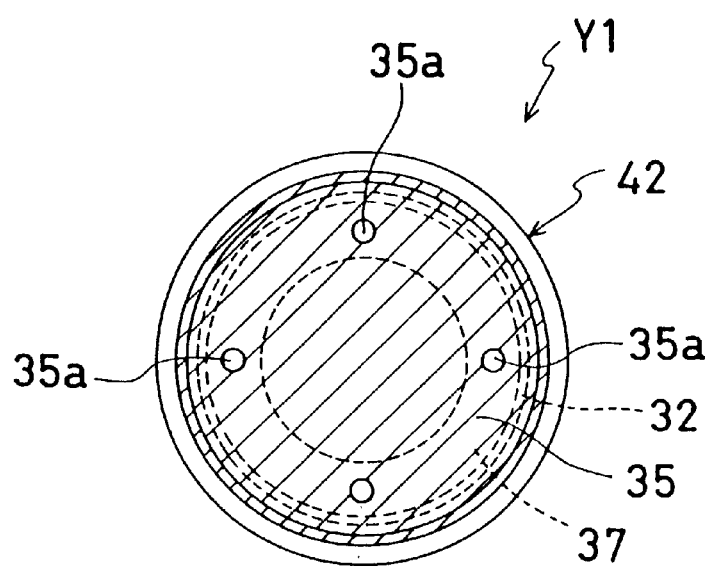

The enclosed space S of the housing 31 is partitioned into two, left and right combustion chambers 33, 34 in the axial direction of the housing 31 by the partition member 35. The partition member 35 is fitted in around the inside of the outer casing 42 to partition the interior into the combustion chambers 33, 34 and is fixedly swaged by drawing the periphery of the outer casing 42 (by the process to reduce the diameter of the outer casing 42). The partition member 35 has a number of gas passing holes 35a formed at its marginal portion around the outside thereof. The gas passing holes 35a are formed, with spaced apart at 90 degree circumferentially of the housing 31, as shown in FIG. 10(b), and extend through the partition member 35 in the axial direction of the housing 31 to make the combustion chambers 33, 34 communicate to each other. In the combustion chambers 33, 34 partitioned by the partition member 35, the gas generating agents 36 are packed and also the filtering members 37 and the inner cylindrical members 32 are arranged in sequence to surround the gas generating agents.

The filtering members 37 are fitted in the convex portions 41a of the lid members 41, respectively, and hold the partition member 35 in sandwich relation therebetween at their ends extending to the partition member 35 to cover the gas passing holes 35a. Thus, the combustion chambers 33, 34 are so structured as to communicate to each other through the filtering member 37 and the gas passing holes 35a. The filtering members 37 are each produced by pressing a metal wire of stocking stitch or aggregation of crimped metal wire rods into cylindrical shape as shown in FIGS. 8(a)–(c). The filtering members 37 may each be formed by a plurality of divided filter units being laminated in sequence in the axial direction of the housing 31. This enables the filtering member 37 to be arranged in correspondence to the length of the housing 31 by selectively varying the number of filter units to be laminated.

The inner cylindrical members 32 are fitted in around the outsides of the filtering members 37 in the combustion chambers 33, 34, respectively, to define the annular gas passage spaces S2 between the outer peripheries of the cylindrical inner casings and the inner periphery of the outer casing 42. The inner cylindrical members 32 are fitted in the convex portions 41a of the lid members 41, along with the filtering members 37, and extend from the lid members 41 to the partition member 35. Further, the inner cylindrical members 32 have a number of gas passage holes 32a which are formed in the surfaces around the outside thereof to communicate the interiors of the filtering members 37 and the gas passage spaces S2 to each other. The gas passage holes 32a open at positions away from the positions to confront the gas discharging holes 42a, when viewed from the circumferential direction of the housing 31, as shown in FIG. 10(a), and also are formed along the axial direction of the housing 31. By virtue of this, the gas discharged from the gas passage holes 32a of the inner cylindrical members 32 is not allowed to move directly toward the gas discharging holes 42a of the outer casing 42 but is brought into collision with the inner periphery of the outer casing 42, for a while, for the slag collection and the cooling, before it is discharged from the gas discharge holes 42a into the airbag.

The inner cylindrical members 32 are preferably produced by forming the expanded metal in the cylindrical form, as shown in FIGS. 6 and 7, though it may be produced by forming the punching plate in the cylindrical form. The inner cylindrical members 32, when produced by using the expanded metal, can be allowed to be disposed to be in contact with the inner periphery of the outer casing 42 and the outer peripheries of the filtering members 37, and as such can allow the gas passage space S2 to be defined therebetween by using the expanded metal, as is the case with FIG. 1.

The igniters 38, 39 are each composed of an inflammation agent 44 and an igniting tool 45 for igniting the inflammation agent 44. These igniters are provided in the lid members 41 closing apertures of the outer casing 42 at the both ends thereof, so as to burn the gas generating agents 36 in the combustion chamber 33 and those in the combustion chamber 34 independently of each other. The igniting tools 45 are fixedly swaged in the convex portions 41a of the lid members 41. The inflammation agents 44 are contained in flanged caps 46 fitted in the convex portions 41a of the lid members 41, confronting the igniting tools 45 with a clearance left in the convex portions 41a.

Projecting portions 46a of the flanged caps 46 are fitted in the filtering members 37 and have through holes 46b through which the flame produced by the ignition of the inflammation agents 44 is spurted into the filtering members 37 in the combustion chambers 33, 34. The flange portions 46c of the flanged caps 46 close the filtering members 37 on the lid member 41 sides, extending to the inner periphery of the outer casing 42 to be held in sandwich relation by the lid members 41, the filtering member 37 and the inner cylindrical members 32. Also, the flange portions 46c are in elastic contact with sealing materials 48 to seal the combustion chambers 33, 34 from outside.

Next, operation of the gas generator Y1 for passenger seat or passenger-side collision will be described.

When automobile collision is detected by the collision sensor, only the igniter 38 on the left combustion chamber 33 side is brought into operation to ignite the inflammation agent 44, first. Then, the ignition flame of the inflammation agent. 44 is spurted into the left combustion chamber 33 from the through hole 46b of the flanged cap 46 to force the gas generating agents 36 to be ignited and burnt to thereby produce high temperature gas.

At that time, a part of the high temperature gas generated in the left combustion chamber 33 flows into the right combustion chamber 34 through the filtering members 37 and the gas passing holes 35a. Thus, the combustion in the left combustion chamber 33 is effected with a whole volume (enclosed space S) of the housing 31 including the right combustion chamber 34 communicating to the left combustion chamber through the gas passing holes 35a and others. This produces the pressure characteristic that the pressure rise is suppressed (slowed down) only by the extent corresponding to the increased volume (the volume of the right combustion chamber 34). In addition, when the gas passes through the inner cylindrical member 32 on the right combustion chamber 34 side and the filtering members 37, the heat quantity of the gas flowing into the right combustion chamber 34 is absorbed (cooled) and the temperature of the gas decreases and, thereafter, the gas is spurted out from the filtering member 37 into the right combustion chamber 34. This prevents immediate spontaneous ignition of the gas generating agents 36 in the right combustion chamber 34.

Then, the airbag is inflated and expanded with a modest and weak tension by a small amount of clean gas that is suppressed (slowed down) in pressure rise. In this sense, the cross section area of and the number of gas passing holes 35a of the partition member 35 is adjusted to control a flow rate of the gas to flow into the right combustion chamber 34 so that the airbag can be inflated and expanded by a small amount of gas adapted to have a proper pressure rise characteristic.

Sequentially, when the igniter 39 in the right combustion chamber 34 is operated with small time difference from after the start of combustion of the left combustion chamber 33, the gas generating agents 36 in the right combustion chamber 34 are forcibly ignited to initiate the combustion, so as to produce high temperature gas. The high temperature gas produced in the right combustion chamber 34 is flown into the gas passage space S2 through the gas passage holes 32a in the inner cylindrical member 32 and then is discharged from the gas discharging holes 42a into the airbag, as is the case with the left combustion chamber 33. Thus, the airbag is transferred to the rapid inflation and expansion by a large amount of clean gas discharged from the both combustion chambers 33, 34.

At that time, the combustion in the right combustion chamber 34 is effected with the whole volume (enclosed space S) of the housing 31 including the right combustion chamber communicating to the left combustion chamber 33 through the gas passing holes 35a and others, as is the case with the left combustion chamber 33. As a result of this, the clean gas discharged into the airbag has the pressure rise characteristic produced by the addition of the gas pressure resulting from the combustion in the right combustion chamber 34 to the gas pressure of the whole housing 31 at the time of operation of the igniter 39 (the gas pressure resulting from the combustion in the left combustion chamber 33). The airbag is inflated and expanded rapidly with equilibrium pressure of these pressures as the maximum pressure Pmax.

In this sense, with the increased small time difference between the igniters 38 and 39, the gas burnt in the left combustion chamber 33 can spread in volume throughout the whole housing 31 including the right combustion chamber 34, and as such can provide a moderate pressure rise characteristic for the gas discharged into the airbag and also enables the maximum pressure Pmax to be kept down.

Thus, the pressure rise characteristic of the gas discharged into the airbag and the maximum pressure Pmax can be controlled by appropriately changing the small time difference with which the igniters 38, 39 are operated, so that when the airbag is inflated and expanded, the shock to riders can be absorbed. As a result of this, the airbag is started being inflated and expanded moderately by a small amount of gas which is generated in the left combustion chamber 33 only and suppressed in pressure rise in the initial stage of expansion and, with the small time difference, is inflated and expanded rapidly by a large amount of gas generated in the both combustion chambers 33, 34 to have the specified pressure rise characteristic and the maximum pressure Pmax.

Thus, according to the gas generator Y1 for passenger seat or passenger-side collision, even when a rider is seated immediately behind the instrument panel, the airbag can be prevented from being inflated and expanded rapidly in the initial expansion stage to give the rider a shock and can fulfill its intended function to protect the rider.

The gas generator Y2 for passenger seat or passenger-side collision shown in FIGS. 11 and 12 will be described.

Figure 11:
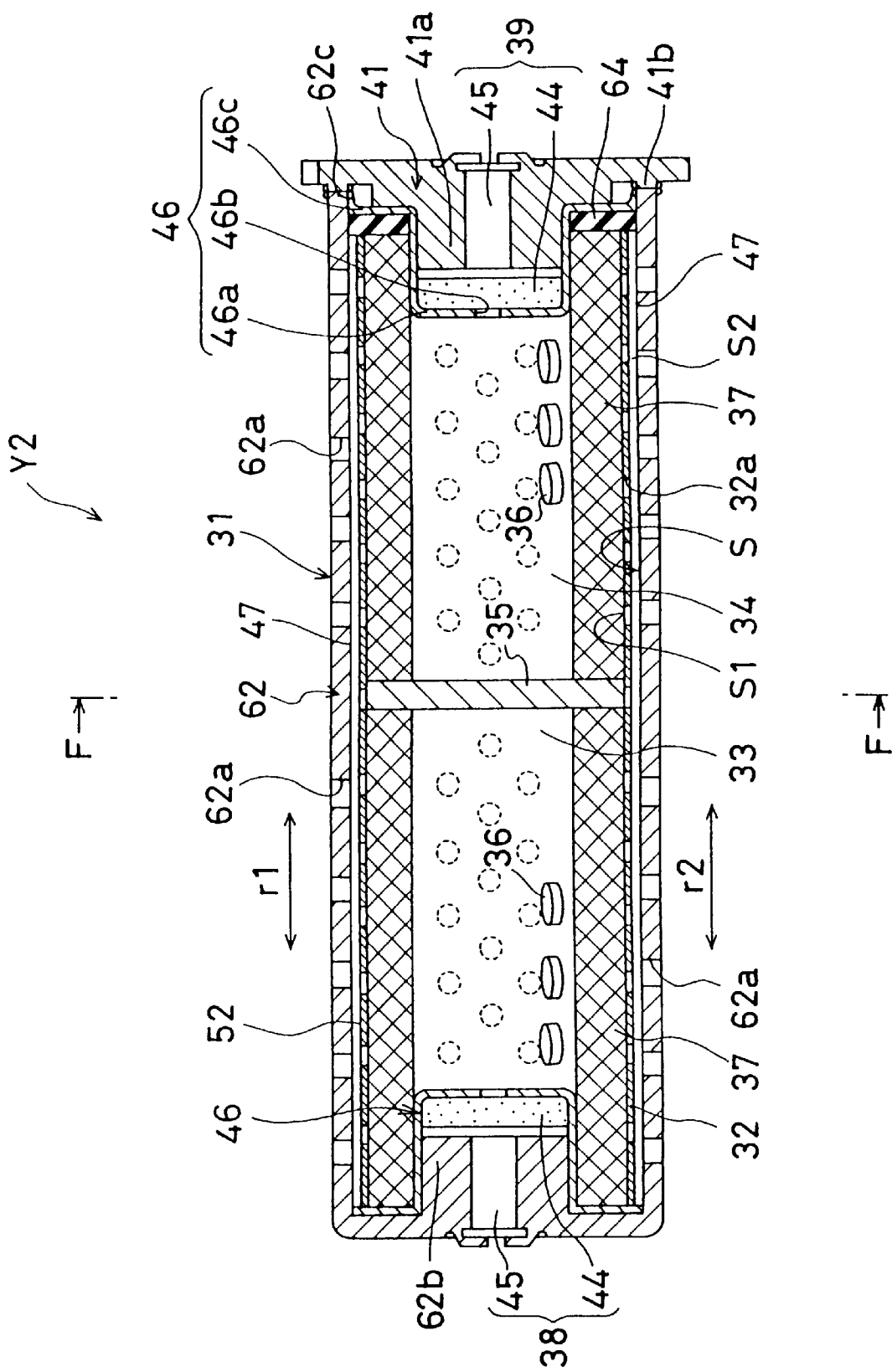
FIG. 11 is a sectional view showing another gas generator for passenger seat or for passenger-side collision.
Figure 12:
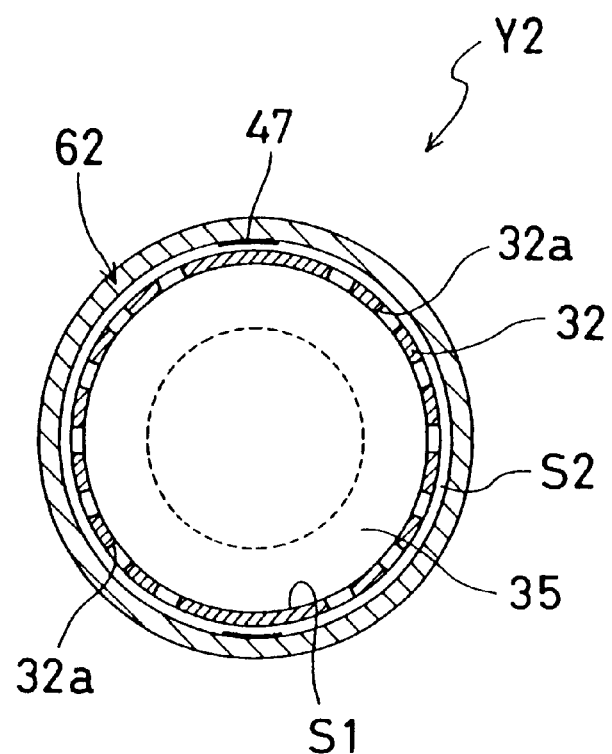
FIG. 12 is a sectional view taken along the line F—F of FIG. 11.

The gas generator Y2 of FIGS. 11 and 12 is different from the gas generator Y1 of FIG. 9 in the construction of the housing 31 and the partition member 35 and in that the inner cylindrical member 32 is arranged to extend through the both combustion chambers 33, 34. Like reference characters refer to corresponding to members of FIGS. 9 and 10 and repetition of description thereon is omitted.

The gas generator Y2 of FIGS. 11 and 12 comprises the housing 31 having, in its interior, the enclosed space S formed by an elongated, cylindrical, outer casing 62 having a bottom and an opening at one end thereof and the lid member 41 closing the opening at the one end of the outer casing 62.

The housing 31 is structured to form the enclosed space S in the interior thereof by joining a ring-like rib 41b formed around the margins of the lid member 41 and the opening at the end of the outer casing 62 to each other by butt welding (e.g. friction press-contact). The outer casing 62 has a number of gas discharging holes 62a for every line of gas holes r1, r2, as is the case with FIG. 10(a). Formed on the bottom of the outer casing 62 is a projection 62b projecting out into the enclosed space S. Arranged in the interior of the housing 31 is the inner cylindrical member 32 extending between the bottom of the outer casing 62 and the lid member 41. The inner cylindrical member 32 partitions the enclosed space S of the housing 31 into the combustion space S1 on the inner side of the inner cylindrical member 32 and the gas passage space S2 defined between the outer side of the same and the inner periphery of the outer casing 62.

The combustion space S1 of the inner cylindrical member 32 is partitioned into two, left and right combustion chambers 33, 34 by the partition member 35 press-fitted in the inner cylindrical member 32. In the combustion chambers 33, 34, the gas generating agents 36 are packed and also the filtering members 37 are arranged in the inner cylindrical members 32 to surround the gas generating agents.

The filtering members 37 are fitted onto the projecting portion 62b and the convex portion 41a of the lid member 41, together with the inner cylindrical member 32, and hold the partition member 35 in sandwich relation therebetween at their ends extending to the partition member 35. Thus, the combustion chambers 33, 34 are so structured as to communicate to each other through the filtering members 37, the gas passage holes 32a of the inner cylindrical member 32 and the gas passage space S2.

The igniting tools 45 of the igniters 38, 39 are fixedly swaged in the lid member 41 and the projecting portion 62b, respectively, as is the case with FIG. 9. The inflammation agents 44 are contained by the flanged caps 46, confronting the igniting tools 45. The flanged cap 46 on the lid member 41 side is fixed in the state in which the end of the flange 46c is in abutment with flash 62c formed when the outer casing 62 and the lid member 41 are welded. 64 designates an annular seal plate interposed between the flange portion 46c of the cap 46 on the lid member 41 side and the end of the filtering member 37 in the combustion chamber 34.

Next, operation of the gas generator Y2 for passenger seat or passenger-side collision will be described.

When automobile collision is detected by the collision sensor and only the igniter 38 on the left combustion chamber 33 side is brought into operation, the combustion gas generated in the left combustion chamber 33 is subjected to slag collection and cooling in the filtering member 37, then is uniformed in the gas passage space S2, and thereafter is started being discharged into the airbag, as is the case with FIG. 9.

At that time, a part of the combustion gas generated in the left combustion chamber 33 flows into the right combustion chamber 34 through the filtering members 37 and the gas passage space S2. Thus, the airbag is inflated and expanded with a modest and weak tension by a small amount of clean gas which is generated in the left combustion chamber 33 only and suppressed (slowed down) in pressure rise. As is the case with the gas generator Y1 of FIG. 9, the cross section area of the gas passage space S2 for the gas to pass through is adjusted to obtain a proper pressure rise characteristic.

Sequentially, when the igniter 39 in the right combustion chamber 34 is operated with small time difference from after the start of combustion of the left combustion chamber 33, the gas generating agents 36 in the right combustion chamber 34 initiate the combustion, so that the airbag is transferred to the rapid inflation and expansion by a large amount of clean gas discharged from the both combustion chambers 33, 34, as is the case with FIG. 9.

At that time, the combustion in the right combustion chamber 34 is effected with the whole volume of the housing 1 including the right combustion chamber communicating to the left combustion chamber 33 through the gas passage space S2, as is the case with the left combustion chamber 33. As a result of this, the clean gas discharged into the airbag has the pressure rise characteristic produced by the addition of the gas pressure resulting from the combustion in the right combustion chamber 34 to the gas pressure of the whole housing 1 at the time of operation of the igniter 39. Thus, the airbag is inflated and expanded rapidly with equilibrium pressure of these pressures as the maximum pressure Pmax.

Thus, according to the gas generator Y2 for passenger seat or passenger-side collision, the expansion of the airbag can be controlled with ease to fulfill its intended function securely, as is the case with the gas generator Y1 for passenger seat or passenger-side collision of FIG. 9.

The gas generator Y3 for passenger seat or passenger-side collision shown in FIGS. 13 and 14 will be described.

Figure 13:
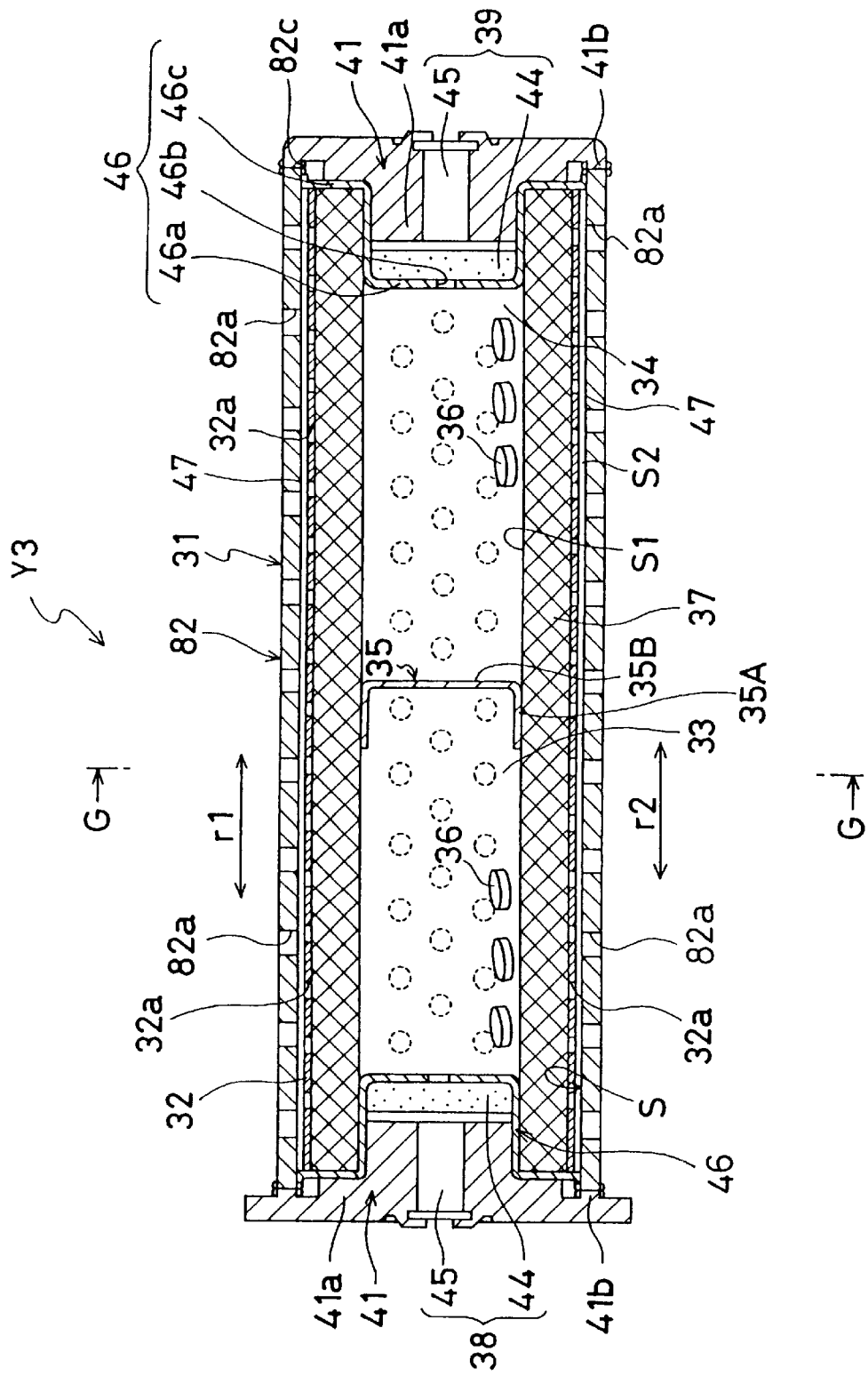
FIG. 13 is further another gas generator for passenger seat or for passenger-side collision.
Figure 14:
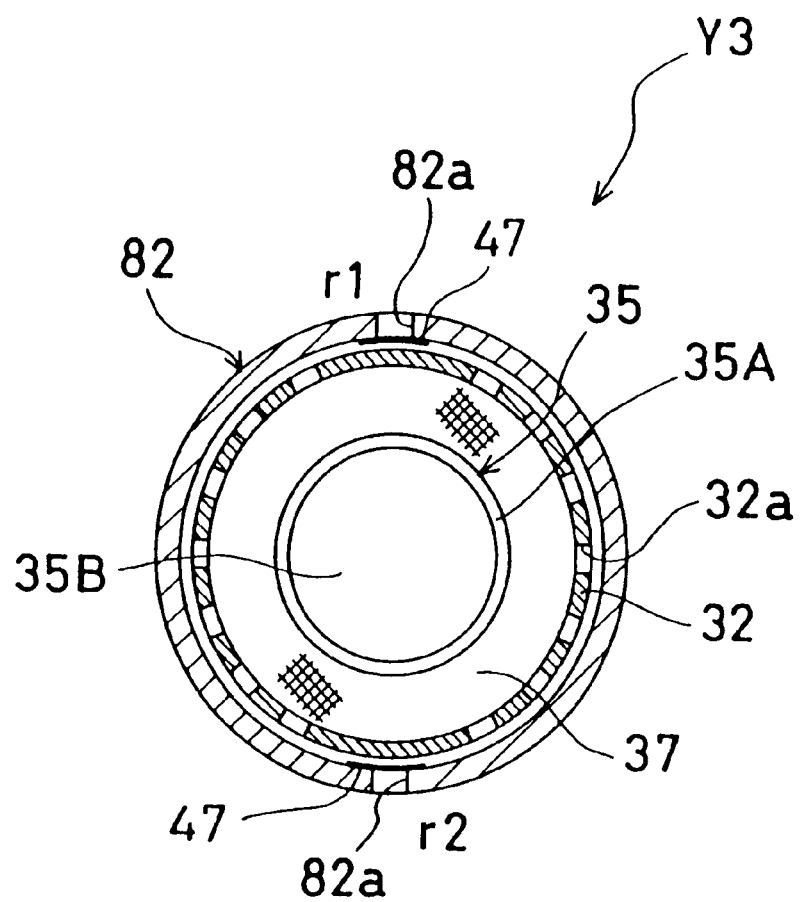
FIG. 14 is a sectional view taken along the line G—G of FIG. 13.

The gas generator Y3 of FIGS. 13 and 14 is different from the gas generator Y1 of FIG. 9 in the construction of the housing 31 and in that the inner cylindrical member 32 and the filtering member 37 are arranged to extend through the both combustion chambers 33, 34. Like reference characters refer to corresponding to members of FIGS. 9 and 10 and repetition of description thereon is omitted.

The gas generator Y3 of FIGS. 13 and 14 comprises the housing 31 having, in its interior, the enclosed space S formed by joining the ring-like ribs 41b of the lid members 41 to the openings of the elongated, cylindrical, outer casing 82 at both ends thereof by butt welding (e.g. friction press-contact). The outer casing 82 has a number of gas discharging holes 82a for every line of gas holes r1, r2, as is the case with FIG. 10(a). Arranged in the interior of the housing 31 are the inner cylindrical member 32 and the filtering member 37 fitted in the inner cylindrical member 32 extending between the lid members 41. The filtering member 37 is fitted in the convex portions 41a of the lid members 41, together with the inner cylindrical member 32, and partitions the enclosed space S of the housing 31 into the gas passage space S2 defined between the outer periphery of the inner cylindrical member 32 and the inner periphery of the outer casing 82 and the combustion space S1 on the inner side of the filtering member 37.

The combustion space S1 in the filtering member 37 is partitioned into two, left and right combustion chambers 33, 34 axially of the housing 31 by the partition member 35. The partition member 35 has a cylindrical portion 35A which is fitted in around the inside of the filtering member 37. and whose opening on the combustion chamber 33 side is closed by a disk 35B to partition the combustion chambers 33, 34. Thus, the combustion chambers 33, 34 are structured to communicate to each other through the filtering member 37, or the filtering member 37, the inner cylindrical member 32 and the gas passage space S2. In the combustion chambers 33, 34, the gas generating agents 36 are packed.

The igniting tools 45 of the igniters 38, 39 are fixedly swaged in the lid members 41 and the inflammation agents 44 are contained by the flanged caps 46, confronting the igniting tools 45, as is the case with FIG. 9. The flanged caps 46 are fixed in the state in which the ends of the flanges 46c are in abutment with flashes 82c formed when the outer casing 82 and the lid members 41 are welded.

Next, operation of the gas generator Y3 for passenger seat or passenger-side collision will be described.

When automobile collision is detected by the collision sensor and only the igniter 38 on the left combustion chamber 33 side is brought into operation, the combustion gas generated in the left combustion chamber 33 is subjected to slag collection and cooling in the filtering member 37, then is uniformed in the gas passage space S2, and thereafter is started being discharged into the airbag, as is the case with FIG. 9.

At that time, a part of the combustion gas generated in the left combustion chamber 33 flows into the right combustion chamber 34 through the filtering member 37, the gas passage space S2 and others. Thus, the airbag is inflated and expanded with a modest and weak tension by a small amount of clean gas which is generated in the left combustion chamber 33 only and suppressed (slowed down) in pressure rise. As is the case with the gas generator Y1 of FIG. 9, the cross section areas of the filtering member 37 and the gas passage space S2 for the gas to pass through are adjusted to obtain a proper pressure rise characteristic.

Sequentially, when the igniter 39 in the right combustion chamber 34 is operated with small time difference from after the start of combustion of the left combustion chamber 33, the gas generating agents 36 in the right combustion chamber 34 initiate the combustion, so that the airbag is transferred to the rapid inflation and expansion by a large amount of clean gas discharged from the both combustion chambers 33, 34, as is the case with FIG. 9.

At that time, the combustion in the right combustion chamber 34 is effected with the whole volume of the housing 31 including the right combustion chamber communicating to the left combustion chamber 33 through the filtering member 37 and others, as is the case with the left combustion chamber 33. As a result of this, the clean gas discharged into the airbag has the pressure rise characteristic produced by the addition of the gas pressure resulting from the combustion in the right combustion chamber 34 to the gas pressure of the whole housing 31 at the time of operation of the igniter 39. Thus, the airbag is inflated and expanded rapidly with equilibrium pressure of these pressures as the maximum pressure Pmax.

Thus, according to the gas generator Y3 for passenger seat or passenger-side collision, the expansion of the airbag can be controlled with ease to fulfill its intended function securely, as is the case with the gas generator Y1 for passenger seat or passenger-side collision of FIG. 9.

In the gas generators Y1–Y3 for passenger seat or passenger-side collision, the operation of the igniters 38, 39 are controlled to fitly meet the patterns of automobile collision, as is the case with the gas generators X1–X3 for driver seat. In the case of critical collision such as frontal clash at high speed, the igniters 38, 39 are operated concurrently. In the case of medium collision, the igniters 38, 39 are operated with the small time difference. Further, in the case of light bump or collision, only one igniter 38 is operated. Thus, the expansion patterns of the airbag are selectively controlled for the patterns of automobile collision, as is the case with the gas generators for driver seat X1–X3.

The gas generators Y1–Y3 for passenger seat or passenger-side collision as illustrated take the pattern that after the gas generating agents 36. in the left combustion chamber 33 are burnt, the gas generating agents 36 in the right combustion chamber 34 are burnt, but this. pattern is not restrictive. The pattern may be taken that after the right combustion chamber 34 are burnt, the left combustion chamber 33 are burnt. Further, modification may also be made by rendering the combustion chambers 33, 34 different in volume so that one of the combustion chambers can be made larger in volume than the other and also starting the combustion from the combustion chamber of a larger volume.

Further, in the gas generators for passenger seat or passenger-side collision Y1–Y3, the cushioning member 25 shown in FIG. 1 may be arranged to be in abutment with the partition member 35. This can prevent degradation of the gas generating agents 36 and also can suppress heat transfer between the combustion chambers 33 and 34, as is the case with the gas generators for driver seat X1–X3 shown in FIGS. 1–5, to properly control the expansion of the airbag.

While the gas generators X1–X3 and Y1–Y3 illustrated above is so structured that the two combustion chambers 3; 4, 33; 34 are partitioned by the partition member 5; 35, this is not of restrictive. The illustrated gas generators may be modified so that three or more combustion chambers may be partitioned by changing the number of partition members 5, 35 to be fitted and also the igniter are disposed in each of those combustion chambers, so as to achieve multistage control of the expansion of the airbag.

Shown in FIG. 15 are graphs showing the comparison test results of the pressure rise characteristics and the maximum pressure between the examples of the gas generators of the present invention and the comparative examples of the gas generators.

The examples of the gas generator each have two combustion chambers which are partitioned and communicated to each other and two igniters for forcing the gas generating agents in the two combustion chambers to be burnt independently of each other (See FIGS. 1–14). On the other hand, the comparative examples of the gas generator each have two combustion chambers which are partitioned with their interior spaces closed and two igniters for forcing the gas generating agents in the two combustion chambers to be burnt independently of each other.

The experiments were carried out under the condition of t=0 ms, 10 ms and 20 ms, using a 60 liter tank, where t is a small time difference with which the igniters of the gas generators of the examples and comparative examples are ignited. In the gas generators of the examples and comparative examples, the pressure rise and the maximum pressure Pmax in the 60 liter tank were measured every time difference t, the results being shown in FIGS. 15(a) and 15(b).

Figure 15A:
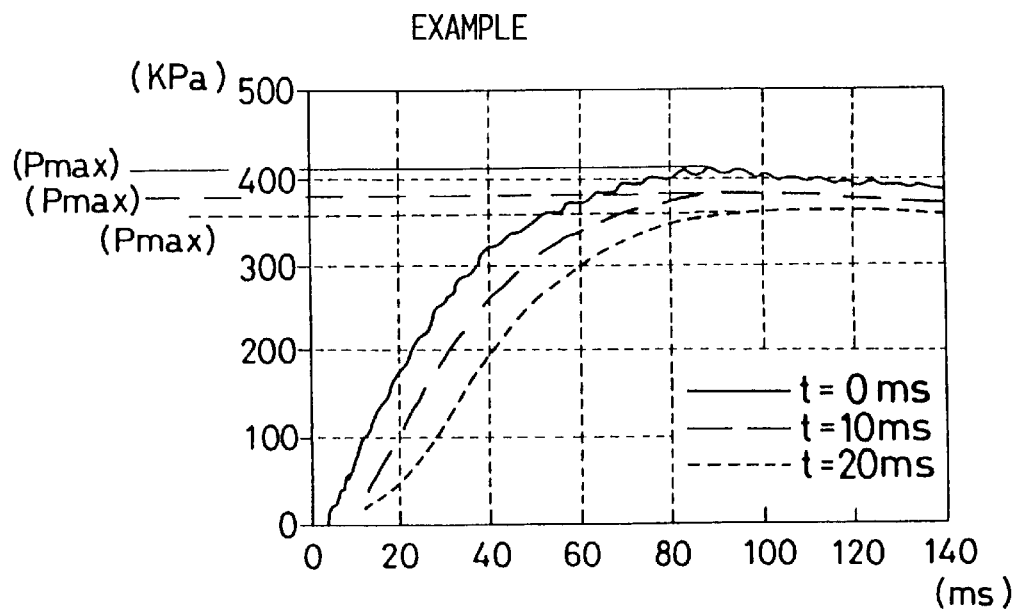
FIG. 15 is a graph showing the comparison of pressure rise characteristics and maximum pressure between the gas generators according to the present invention and the gas generators of comparative examples.

It was found from FIG. 15(a) that the gas generators of the examples had the tendency of the pressure rise to be suppressed with an increase in small time difference t with which the igniters were operated. It was also found therefrom that the maximum pressure Pmax was held down with an increase in small time difference t with which the igniters were operated. This is probably caused by the construction in which the combustion chambers are communicated to each other, so that the combustion in the respective combustion chambers is effected with a large volume of the whole housing.

Figure 15B:
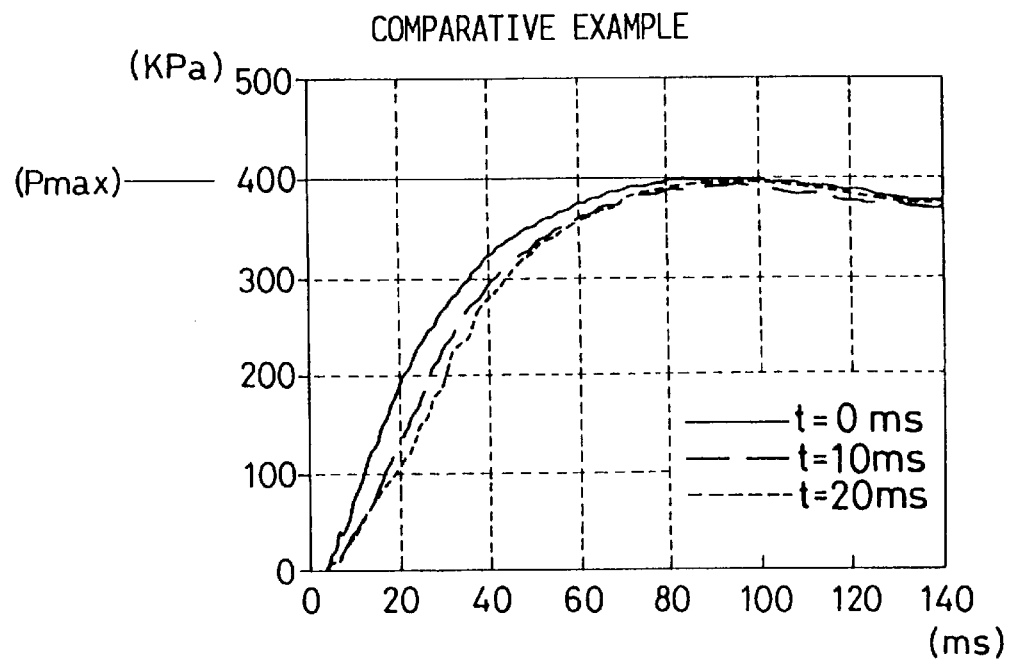
Figure 16:
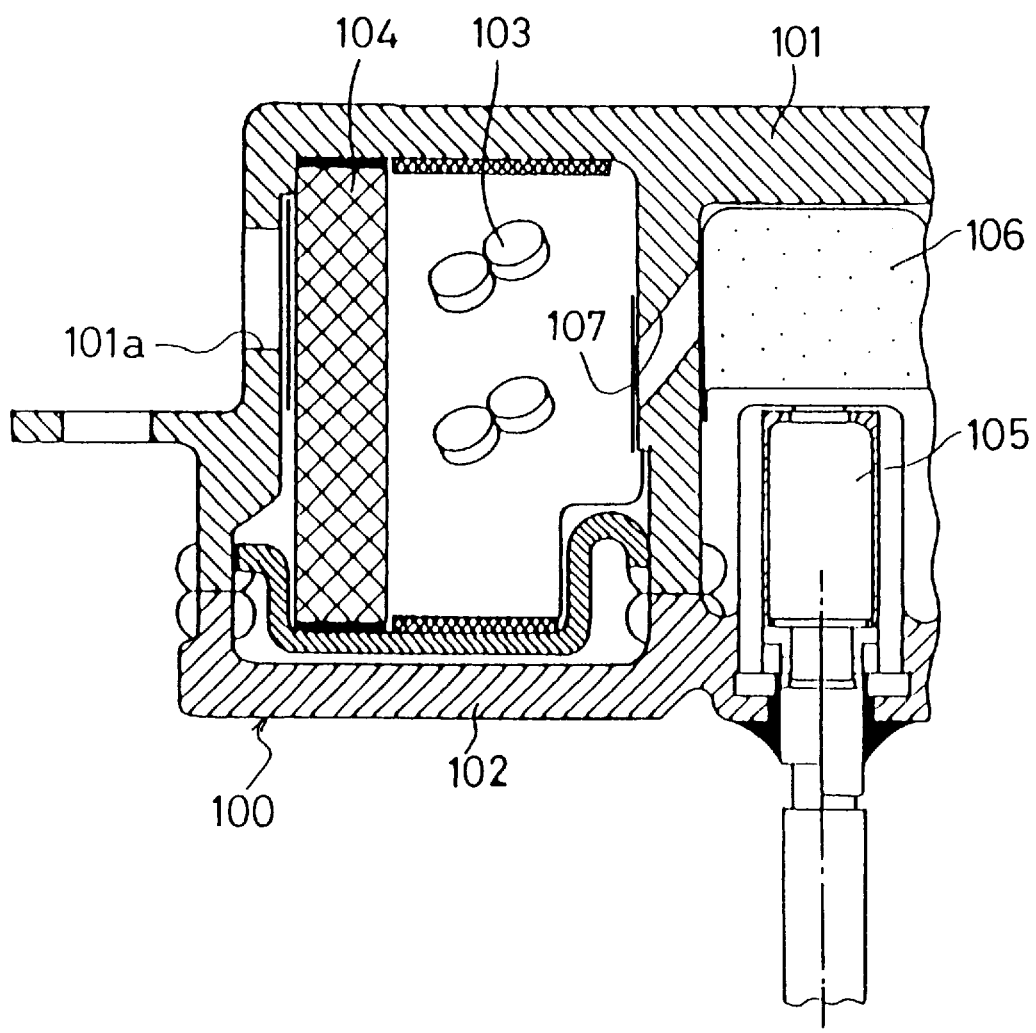
FIG. 16 is a sectional view showing a conventional gas generator for driver seat.

In contrast to this, it was found from FIG. 15(b) that the gas generators of the comparative examples had the tendency of the pressure rise to be suppressed with an increase in small time difference t with which the igniters were operated, but the maximum pressure Pmax was kept relatively high. This is probably caused by the construction in which the combustion chambers are isolated from each other with their interior spaces closed, so that the combustion in the respective combustion chambers is effected with a smaller volume (volume of the combustion chamber itself), when compared with the examples.

Hence, it is optimum for achieving the two-stage inflation and expansion of the airbag to use the gas generators of the examples (the gas generators of FIGS. 1–14) having the capability of being controlled to a gas pressure (maximum pressure Pmax) of a level that does not give any shock to the rider even when the airbag is inflated and expanded rapidly not only at its initial expansion stage but also at the later stage.

The gas generators of the comparative examples are controlled to substantially the same maximum pressure Pmax, regardless of the time difference t with which the igniters are operated. Due to this, even when the igniters are operated with small time difference t, the maximum gas pressure cannot be controlled to a gas pressure of a level that does not give any shock to the rider. Hence, even if the airbag is inflated and expanded in two stages, the airbag is eventually inflated and expanded by a relatively high pressure (maximum pressure Pmax) which may possibly give a shock to the rider. Particularly when the medium collision or light bump or collision of an automobile occurs, the rider could be in danger.

Capabilities of Exploitation in Industry As seen from the foregoing, the gas generator according to the present invention is useful for the inflation and expansion of the airbag for driver seat and passenger seat or passenger-side collision.

What is claimed is:

1. A gas generator comprising a housing having a plurality of gas discharging holes and forming an enclosed space in an interior thereof,
    wherein the housing is composed of a short, cylindrical, outer casing and upper and lower lids and for closing the outer casing at upper and lower ends thereof,
    wherein the enclosed space is partitioned into two, upper and lower, combustion chambers by a partition member arranged between the upper lid and the lower lid and in the combustion chambers, gas generating agents for generating high temperature gas by burning are packed and at least one filtering member is arranged to surround the gas generating agents,
    wherein the lower lid forms thereon a long, cylindrical, inner casing extending through the partition member into the upper combustion chamber and a short, cylindrical, inner casing extending into the lower combustion chamber,
    wherein igniters for burning the gas generating agents in their combustion chambers are arranged in the inner casings, respectively.

2. The gas generator as set forth in claim 1, wherein the partition member has a convex portion formed to contain the igniter disposed in an interior of the lower combustion chamber by use of the short, cylindrical, inner casing.

3. The gas generator as set forth in claim 1, wherein the partition member is positioned by abutment with a step portion formed in the long, cylindrical, inner casing.

4. The gas generator as set forth in claim 1, wherein the long, cylindrical, inner casing is disposed in a center part of the lower lid and also extends to the upper lid to be butt-jointed to the upper lid.

5. The gas generator as set forth in claim 4, wherein the partition member has a convex portion formed to contain the igniter disposed in an interior of the lower combustion chamber by use of the short, cylindrical, inner casing.

6. The gas generator as set forth in claim 4, wherein the partition member is positioned by abutment-with a step portion formed in the long, cylindrical, inner casing.

7. The gas generator as set forth in claim 1, comprising an inner cylinder member having a plurality of gas passage holes, wherein
    the enclosed space is partitioned into a combustion space inside of the inner cylinder member and a gas passage space outside of the inner cylinder member,
    the combustion space is partitioned into two, upper and lower, combustion chambers by a partition member fitted in the inner cylinder member,
    the filtering members are respectively fitted in the upper and lower combustion chambers, and
    the upper and lower combustion chambers communicate with each other so that gas generated in one chamber of the upper and lower combustion,chambers flows into other chamber of the upper and lower combustion chambers by means of passing through the filtering member, the gas passage holes of the inner cylinder member and the gas passage space.

8. The gas generator as set forth in claim 7, wherein the partition member has a convex portion formed to contain the igniter disposed in an interior of the lower combustion chamber by use of the short, cylindrical, inner casing.

9. The gas generator as set forth in claim 7, wherein the partition member is positioned by abutment with a step portion formed in the long, cylindrical, inner casing.

10. The gas generator as set forth in claim 7, wherein the inner cylindrical member is formed by forming an expanded metal having a plurality of gas passage holes into a cylindrical form and is disposed so that its outer periphery is close to the outer casing and its inner periphery is in contact with the filtering member, and wherein a cylindrical portion of the expanded metal serves as the gas passage space as well.

11. The gas generator as set forth in claim 7, wherein the long, cylindrical, inner casing is disposed in a center part of the lower lid and also extends to the upper lid to be butt-jointed to the upper lid.

12. The gas generator as set forth in claim 11, wherein the partition member has a convex portion formed to contain the igniter disposed in an interior of the lower combustion chamber by use of the short, cylindrical, inner casing.

13. The gas generator as set forth in claim 11, wherein the partition member is positioned by abutment with a step portion formed in the long, cylindrical, inner casing.

14. The gas generator as set forth in claim 1, comprising an inner cylinder member having a plurality of gas passage holes, wherein
    the filtering member is fitted in the inner cylinder member,
    the enclosed space is partitioned into a combustion space inside of the filtering member and a gas passage space outside of the inner cylinder member,
    the combustion space is partitioned into two, upper and lower, combustion chambers by a partition member fitted in the filtering member, and
    the upper and lower combustion chambers communicate with each other so that gas generated in one chamber of the upper and. lower combustion chambers flows into other chamber of the upper and lower combustion chambers when the gas passes through the filtering member, the gas passage holes of the inner cylinder member and the gas passage space.

15. The gas generator as set forth in claim 14, wherein the inner cylindrical member is formed by forming an expanded metal having a plurality of gas passage holes into a cylindrical form and is disposed so that its outer periphery is close to the outer casing and its inner periphery is in contact with the filtering member, and wherein a cylindrical portion of the expanded metal serves as the gas passage space as well.

16. The gas generator as set forth in claim 14, wherein the partition member has a convex portion formed to contain the igniter disposed in an interior of the lower combustion chamber by use of the short, cylindrical, inner casing.

17. The gas generator as set forth in claim 14, wherein the partition member is positioned by abutment with a step portion formed in the long, cylindrical, inner casing.

18. The gas generator as set forth in claim 14, wherein the long, cylindrical, inner casing is disposed in a center part of the lower lid and also extends to the upper lid to be butt-jointed to the upper lid.

19. The gas generator as set forth in claim 18, wherein the partition member has a convex portion formed to contain the igniter disposed in an interior of the lower combustion chamber by use of the short, cylindrical, inner casing.

20. The gas generator as set forth in claim 18, wherein the partition member is positioned by abutment with a step portion formed in the long, cylindrical, inner casing.

21. The gas generator as set forth in claim 1, wherein
the enclosed space is partitioned into two, upper and lower, combustion chambers by the partition member which is fitted in the outer casing,
the partition member has gas passing holes, and
the upper and lower combustion chambers communicate with each other so that gas generated in one chamber of the upper and lower combustion chambers flows into other chamber of the upper and lower combustion chambers by means of passing through the gas passing holes.

22. The gas generator as set forth in claim 21, wherein the partition member has a convex portion formed to contain the igniter disposed in an interior of the lower combustion chamber by use of the short, cylindrical, inner casing.

23. The gas generator as set forth in claim 21, wherein the partition member is positioned by abutment with a step portion formed in the long, cylindrical, inner casing.

24. The gas generator as set forth in claim 21, wherein the long, cylindrical, inner casing is disposed in a center part of the lower lid and also extends to the upper lid to be butt-jointed to the upper lid.

25. The gas generator as set forth in claim 24, wherein the partition member has a convex portion formed to contain the igniter disposed in an interior of the lower combustion chamber by use of the short, cylindrical, inner casing.

26. The gas generator as set forth in claim 24, wherein the partition member is positioned by abutment with a step portion formed in the long, cylindrical, inner casing.

27. The gas generator as set forth in claim 1, wherein a cushioning member for suppressing transmission of combustion heat produced by the burning of the gas generating agents is arranged in the partition member between the combustion chambers.

28. The gas generator as set forth in claim 1, wherein at least one filtering member is formed by pressing a metal wire of stocking stitch or aggregation of crimped metal wire rods into cylindrical shape.

29. A gas generator comprising a housing having a plurality of gas discharging holes and forming an enclosed space in an interior thereof, wherein
the housing is formed by an elongated, cylindrical, outer casing with closed openings at both ends thereof,
the enclosed space is partitioned into two combustion chambers by a partition member,
in the combustion chambers, gas generating agents for generating high temperature gas by burning are packed and at least one filtering member is arranged to surround the gas generating agents,
two igniters for burning the gas generating agents in their combustion chambers are respectively arranged at both ends of the outer casing, and
the combustion chambers communicate with each other so that gas generated in one chamber of the two combustion chambers flows into the other chamber of the two combustion chambers by means of passing through at least one filtering member.

30. The gas generator as set forth in claim 29, further comprising two inner cylindrical members having a plurality of gas passage holes, wherein
the enclosed space of the housing is partitioned into two, left and right combustion chambers by the partition member fitted in the outer casing,
the two inner cylinder members are respectively disposed in the left and right combustion chambers so as to define gas passage spaces between the inner cylinder members and an inner periphery of the outer casing,
the filtering members are respectively fitted in the inner cylindrical members,
the partition member has gas passing holes at the position on which the filter members are disposed, and
the left and right combustion chambers communicate with each other so that gas generated in one chamber of the left and right combustion chambers flows into other chamber of the left and right combustion chambers by means of passing through the filtering members and the gas passing holes of the partition member.

31. The gas generator as set forth in claim 30, wherein the inner cylindrical member is formed by forming an expanded metal having a plurality of gas passage holes into a cylindrical form and is disposed so that its outer periphery is close to the outer casing and its inner periphery is in contact with the filtering member, and wherein a cylindrical portion of the expanded metal serves as the gas passage space as well.

32. The gas generator as set forth in claim 29, further comprising an inner cylindrical member having a plurality of gas passage holes, wherein
the enclosed space of the housing is partitioned into a combustion space inside of the inner cylindrical member and a gas passage space outside of the inner cylindrical member,
the combustion space is partitioned into two, left and right combustion chambers by the partition member fitted in the inner cylindrical member,
the filtering members are respectively fitted in the inner cylindrical members, and
the left and right combustion chambers communicate with each other so that gas generated in one chamber of the left and right combustion chambers flows into other chamber of the left and right combustion chambers by means of passing through the filtering members, the gas passage holes of the inner cylindrical member and the gas passage space.

33. The gas generator as set forth in claim 32, wherein the inner cylindrical member is formed by forming an expanded metal having a plurality of gas passage holes into a cylindrical form and is disposed so that its outer periphery is close to the outer casing and its inner periphery is in contact with the filtering member, and wherein a cylindrical portion of the expanded metal serves as the gas passage space as well.

34. The gas generator as set forth in claim 29, further comprising an inner cylindrical member having a plurality of gas passage holes, wherein
the filtering member is fitted in the inner cylindrical members,
the enclosed space of the housing is partitioned into a combustion space inside of the filtering member and a gas passage space outside of the inner cylindrical member,
the combustion space is partitioned into two, left and right combustion chambers by the partition member fitted in the filtering member, and
the left and right combustion chambers communicate with each other so that gas generated in one chamber of the left and right combustion chambers flows into other chamber of the left and right combustion chambers when the gas passes through the filtering member, the gas passage holes of the inner cylindrical member and the gas passage space.

35. The gas generator as set forth in claim 34, wherein the inner cylindrical member is formed by forming an expanded metal having a plurality of gas passage holes into a cylindrical form and is disposed so that its outer periphery is close to the outer casing and its inner periphery is in contact with the filtering member, and wherein a cylindrical portion of the expanded metal serves as the gas passage space as well.

36. The gas generator as set forth in claim 29, wherein a cushioning member for suppressing transmission of combustion heat produced by the burning of the gas generating agents is arranged in the partition member between the combustion chambers.

37. The gas generator as set forth in claim 29, wherein at least one filtering member is formed by pressing a metal wire of stocking stitch or aggregation of crimped metal wire rods into cylindrical shape.

38. A gas generator comprising a housing having a plurality of gas discharging holes and forming an enclosed space in an interior thereof, wherein the enclosed space is partitioned into a plurality of combustion chambers, gas generating agents for generating high temperature gas by burning are respectively packed in the combustion chambers, at least one filtering member is arranged so as to surround the gas generating agents, ignites for burning the gas generating agents in their combustion chambers are arranged in the housing, and the combustion chambers communicate with one another so that gas generated in one chamber of the plurality of combustion chambers flows into another chamber of the plurality of combustion chambers by means of passing through at least one filtering member.

39. The gas generator as set forth in claim 38, wherein the gas passage space is formed between the plurality of combustion chambers and an inner periphery of the housing.

40. The gas generator as set forth in claim 39, the combustion chambers communicate with one another chamber in one chamber of the plurality of combustion chambers flows into another chamber of the plurality of combustion chambers when the gas passes through at least one filtering member and the gas passage space.

41. The gas generator as set forth in claim 38, further comprising an inner cylindrical member having a plurality of gas passage holes, wherein the enclosed space of the housing is partitioned into a combustion space inside of the inner cylindrical member and a gas passage space outside of the inner cylindrical member, the combustion space is partitioned into a plurality of combustion chambers by the partition member fitted in the-inner cylindrical member, the filtering members are respectively fitted in the inner cylindrical members, and the plurality of combustion chambers communicate with one another so that gas generated in one chamber of the plurality of combustion chambers flows into another chamber of the plurality of combustion chambers by means of passing through the filtering members, the gas passing holes of the inner cylindrical member and the gas passage space.

42. The gas generator as set forth in claim 38, further comprising an inner cylindrical member having a plurality of gas passage holes, wherein the filtering member is fitted in the inner cylindrical member, the enclosed space of the housing is partitioned into a combustion space inside of the filtering member and a gas passage space outside of the inner cylindrical member, the combustion space is partitioned into a plurality of combustion chambers by the partition members fitted in the filtering member, and the plurality of combustion chambers communicate with one another so that gas generated in one chamber of the plurality of combustion chambers flows into other chamber of the plurality of combustion chambers when the gas passes through the filtering member, the gas passing holes of the inner cylindrical member and the gas passage space.

43. The gas generator as set forth in claim 38, wherein the enclosed space of the housing is partitioned into a plurality of combustion chambers by the partition members fitted in the housing, the filtering members are respectively arranged in the combustion chambers, the each partition member has gas passing holes at the position on which the filter member is disposed, and the plurality of combustion chambers communicate with one another so that gas generated in one chamber of the plurality of combustion chambers flows into another chamber of the plurality of combustion chambers by means of passing through the filtering members and the gas passing holes of the partition members.

* * * * *